United States Patent
Meenakshisundaram et al.

(10) Patent No.: US 12,544,975 B2
(45) Date of Patent: Feb. 10, 2026

(54) VOXELATED MOLECULAR PATTERNING IN 3-DIMENSIONAL FREEFORMS

(71) Applicants: UNIVERSITY OF PITTSBURGH—OF THE COMMONWEALTH SYSTEM OF HIGHER EDUCATION, Pittsburgh, PA (US); BOARD OF REGENTS, THE UNIVERSITY OF TEXAS SYSTEM, Austin, TX (US)

(72) Inventors: Ravi Shankar Meenakshisundaram, Aspinwall, PA (US); Mohsen Tabrizi, Pittsburgh, PA (US); Taylor H Ware, Richardson, TX (US)

(73) Assignee: University of Pittsburgh—Of The Commonwealth System of Higher, Pittsburgh, PA (US)

( * ) Notice: Subject to any disclaimer, the term of this patent is extended or adjusted under 35 U.S.C. 154(b) by 473 days.

(21) Appl. No.: 17/621,115

(22) PCT Filed: Jun. 22, 2020

(86) PCT No.: PCT/US2020/039030
§ 371 (c)(1),
(2) Date: Dec. 20, 2021

(87) PCT Pub. No.: WO2021/055063
PCT Pub. Date: Mar. 25, 2021

(65) Prior Publication Data
US 2022/0355540 A1    Nov. 10, 2022

Related U.S. Application Data

(60) Provisional application No. 62/864,276, filed on Jun. 20, 2019.

(51) Int. Cl.
*B29C 64/129*    (2017.01)
*B33Y 40/00*    (2020.01)
(Continued)

(52) U.S. Cl.
CPC ............ *B29C 64/129* (2017.08); *B33Y 40/00* (2014.12); *B33Y 80/00* (2014.12); *B33Y 10/00* (2014.12)

(58) Field of Classification Search
CPC ....................... B33Y 80/00; Y10T 428/24802
See application file for complete search history.

(56) References Cited

U.S. PATENT DOCUMENTS 5,846,452 A * 12/1998 Gibbons .................. G11B 7/25
349/123
6,117,385 A * 9/2000 Chartoff ................. B33Y 70/00
264/435
(Continued)

FOREIGN PATENT DOCUMENTS

KR    20070110173 A    11/2007

OTHER PUBLICATIONS

Ambulo et al. "Four-dimensional Printing of Liquid Crystal Elastomers", ACS Appl. Mater. Interfaces, 2017, vol. 9, pp. 37332-37339 (Year: 2017).*
(Continued)

*Primary Examiner* — Gerard Higgins
(74) *Attorney, Agent, or Firm* — Paul D. Bangor, Jr., Esq.; Clark Hill PLC

(57) ABSTRACT

A four-dimensional ("4D")-printing or 4D-additive manufacturing method for producing anisotropic macroscopic structures and/or anisotropic macroscopic materials having a plurality of voxels, comprising: providing or forming a first layer of a photocurable first liquid crystalline (LC) monomer; wherein the first layer of the first LC monomer has been
(Continued)

provided or formed at a temperature falling within a nematic phase range of the first LC monomer; applying a magnetic field, having a first three-dimensional ("3D") magnetic field vector with respect to an origin point of a 3D coordinate system, to the first layer of first LC monomer or one or more of the plurality of voxels within the first layer of first LC monomer for a first dwell time, to produce in alignment with the first 3D magnetic field vector a first molecular director and/or first nematic alignment vector within the first layer of first LC monomer or within each of the one or more of the plurality of voxels within the first layer of first LC monomer; exposing the first layer of first LC monomer or the one or more of the plurality of voxels within the first layer of first LC monomer to a first dose of light radiation.

17 Claims, 9 Drawing Sheets

(51) Int. Cl.
  *B33Y 80/00* (2015.01)
  *B33Y 10/00* (2015.01)

(56) References Cited

U.S. PATENT DOCUMENTS

| | | | | |
|---|---|---|---|---|
| 6,423,260 | B1 * | 7/2002 | Chartoff | B29C 64/106 |
| | | | | 264/494 |
| 6,963,435 | B2 * | 11/2005 | Mallya | G02F 1/1334 |
| | | | | 349/149 |
| 2019/0077071 | A1 | 3/2019 | Ware et al. | |

OTHER PUBLICATIONS

Lopez-Valdeolivas et al. "4D Printed Actuators with Soft-Robotic Functions", Macromol. Rapid Commun., 2018, vol. 39, pp. 1700710-1 to 1700710-7 (Year: 2017).*
Form PCT/ISA/220, PCT Notification of Transmittal of the International Search Report and the Written Opinion of the International Searching Authority, or the Declaration, PCT/US2020/039030, Date Mailed Apr. 21, 2021.
Form PCT/ISA/210, PCT International Search Report for International Application No. PCT/US2020/039030, Date Mailed Apr. 21, 2021.
Form PCT/ISA/237, PCT Written Opinion of the International Searching Authority for International Application No. PCT/US2020/039030, Date Mailed Apr. 21, 2021.
Form PCT/IB/326, PCT Notification Concerning Transmittal of International Preliminary Report on Patentability, PCT/US2020/039030, Date Mailed Dec. 30, 2021.
Form PCT/IB/373, PCT International Preliminary Report on Patentability for International Application No. PCT/US2020/039030, Date Mailed Dec. 30, 2021.
Yao, Y., et al. "Multiresponsive Polymeric Microstructures with Encoded Predetermined and Self-regulated Deformability", PNAS 10.1073/pnas.1811823115, Dated Dec. 4, 2018, pp. 1-6; Supplementary Information, pp. 1-29.
Kotikian, et al. "3D Printing of Liquid Crystal Elastomeric Actuators with Spatially Programmed Nematic Order", Advanced Materials, 2018, 1706164, pp. 1-6.

* cited by examiner

VOXELATED MOLECULAR PATTERNING IN 3-DIMENSIONAL FREEFORMS

RELATED APPLICATION

This application claims priority benefit under 35 U.S.C. § 119(e) of U.S. Provisional Application No. 62/864,276 filed Jun. 20, 2019 the contents of which are herein incorporated by reference.

GOVERNMENT RIGHTS

This invention was made with government support via grants from NSF, grant #s: 1727551; 1728181; 1752846 and 1663367 and a grant from U.S. Navy Office of Naval Research (NAVY/ONR), grant # N00014-18-1-2856. The government has certain rights in the invention.

BACKGROUND OF THE DISCLOSURE

The ability to pattern material response, voxel-by-voxel, to direct actuation and manipulation in macroscopic structures can enable devices that utilize ambient stimuli to produce functional responses at length-scales ranging from the micro- to the macroscopic. Fabricating liquid crystalline polymers (LCP), where the molecular director is indexably defined in 3-dimensional freeforms can be a key enabler. Here, the combination of anisotropic magnetic susceptibility of the liquid crystalline monomers in a reorientable magnetic field and spatially-selective photopolymerization using a digital micromirror device to independently define molecular orientation in light and/or heat responsive multi-material elements, which are additively incorporated into 3-dimensional freeforms is exploited. This is shown to enable structural complexity across length scales in non-trivial geometries, including reentrant shapes, which are responsive to either heat or light. A range of monomer compositions are optimized to include photoinitiators, light absorbers and polymerization inhibitors to modulate the polymerization characteristics, while simultaneously retaining the tailorability of the nematic alignment. The versatility of this framework is illustrated in an array of examples, including i) thermomechanical generation of Gaussian curved structures from flat geometries, ii) light responsive freeform topographies and iii) multiresponsive manipulators, which can be powered along independent axes using heat and/or light, KEYWORDS: smart materials, liquid crystal polymers, additive manufacturing, 4D printing, soft robotics United States Patent Application Publication No, 20190077071 (the " '071 Publication") published on Mar. 14, 2019, entitled "Extrusion Printing of Liquid Crystal Elastomers" is incorporated by reference herein for all purposes.

As set forth in the '071 Publication, four-dimensional (4D) printing is a term that describes additive manufacturing of stimuli-responsive materials. This process results in 3D structures capable of morphing into a distinct 3D geometry over time. These morphing structures may enable a wide variety of smart devices from soft robots to morphing medical devices. A variety of material strategies have arisen to enable these morphing structures. Printed shape memory polymers can be mechanically processed after fabrication to temporarily store and then recover a printed shape. However, this method may require mechanical programming to achieve desired shape change. To fabricate 3D structures capable of autonomous and reversible shape change, several strategies have been developed that program the stimulus response of the material during the printing process. Important to this strategy is programming material microstructures in a way that controls macroscopic deformations. For example, by controlling the local coefficient of thermal expansion in printed structures, porous objects with negative global coefficient of thermal expansion can be fabricated. However, this deformation is limited by the small magnitude and isotropic nature of thermal expansion. Another approach to designing morphing structures is to locally program anisotropic stimulus response, Direct-write printing (often referred to as extrusion-printing herein), an intrinsic anisotropic process, can be used to create hydrogels that locally swell anisotropically. This large, programmable shape change can be utilized to create structures that bend, twist, or curve on the macroscale. However, shape change in hydrogels is often limited by diffusion speed and the requisite aqueous environment, It would be desirable to have printable materials that undergo large, anisotropic, rapid, and reversible deformations to enable future 4D printed smart systems.

Liquid crystal elastomers (LCEs) are a class of stimuli-responsive polymers that undergo large, reversible, anisotropic shape change in response to a variety of stimuli, including heat and light. Unlike many materials that undergo reversible shape change, these materials neither require an external load nor an aqueous environment, making them ideal candidates for many applications. For LCEs to undergo reversible shape-change in the absence of load, the LCE should be crosslinked in an aligned state. Commonly, partially-crosslinked LCEs are fully crosslinked under a mechanical load leading to permanent orientation of the liquid crystal (LC) molecules within the polymer network. On heating, the resulting aligned LCEs contract along the alignment direction, or nematic director, and expand in the perpendicular axes. With this process, it is difficult to program the stimulus response of the material in a spatially-varied manner. As such, several methods have been developed to align monomeric or oligomeric LCE precursors. Using patterned surface treatments first developed to pattern densely crosslinked LC polymer networks, LC monomers can be patterned with high spatial resolution. LCEs resulting from this process can be designed to undergo both in-plane and out-of-plane patterned shape change. However, this technique maybe limited to the production of relatively thin, planar films (less than 100 µm thick). Shear forces have been shown to induce alignment within monomeric and oligomeric LC molecules. Alignment results from processes such as electrospinning and fiber drawing from the melt. However, to our knowledge, shear has not been used to spatially or hierarchically control alignment within LCEs.

Mechanically-active soft materials may replace traditional actuators in applications where low density, large shape change, and autonomous activation provide critical benefits, including applications such as soft robots, artificial muscles, sensors and aerospace systems. These smart materials can be designed to transduce thermal chemical, magnetic, or light energy into mechanical work. As compared to rigid active materials, such as shape memory alloys, a primary advantage of active soft materials is that polymer processing techniques can be used to control the properties of the material. A number of conventional manufacturing strategies have been employed to fabricate smart, soft material such as casting, fiber spinning, and molding. More recently, additive manufacturing techniques have been applied to mechanically-active polymers. The resulting printed, 3D structures are capable of undergoing change in shape over time and, as such, these manufacturing techniques are denoted as 4D printing. 4D printing has already been used to fabricate a range of mechanically-active smart materials, such as shape memory polymers (SMPs), hydrogels, and fluidic elastomer actuators (FEAs). Demonstrated 4D printed structures include SMP hinges in origami robots, morphing hydrogel structures, and somatosensitive grippers with complex networks of FEA sensors. However, all of these materials strategies have fundamental design limitations preventing them from achieving reversible, untethered, and low-hysteresis shape change that would enable 4D printed materials to operate as autonomous morphing structures. For example, printable SMPs exhibit irreversible deformation, limiting SMPs to applications requiring deployment. Reversible swelling in printed, anisotropic hydrogel composites can be used to create morphing structures, but these materials have relatively low blocking stress and diffusion-limited actuation speed. FEAs can exert high stresses but require a tethered fluid pressure system to induce large reversible deformation.

Liquid crystal elastomers (LCEs) are mechanically-active soft materials that undergo reversible shape change that does not require mechanical bias, aqueous environment, or tethered power source and as such these materials are of interest as actuators and morphing structures. Shape change of up to 400% is observed in response to stimuli that induce the transition of the material from ordered to disordered, most typically a change in temperature. Finkelmann and coworkers first reported this behavior by uniaxially aligning LCEs during crosslinking by applying a load. Recently, several processing methods have arisen to enable LCEs that undergo complex shape change in response to a stimulus. Liquid crystal elastomers with dynamic covalent bonds have been synthesized that can be aligned during bond rearrangement. Furthermore, chemistries amenable to surface alignment techniques have been introduced allowing for precise patterning of the molecular order in a voxel-by-voxel manner. LCEs produced by this method morph reversibly from planar films to complex shapes in response to an environmental stimulus. Recently, our group and others have used direct ink writing (DIW) to print 3D LCE geometries with patterned molecular order. The method utilizes the shear forces imposed on the polymerizable LC ink during the printing process to align the mesogens along the printed path, which is subsequently locked into LCE via photocuring. The resulting 3D structures can be designed to morph between 3D shapes. However, this method has been limited to LCEs with elevated actuation temperatures in excess of 100° C., which limits the functionality of this new processing technique for LCEs.

In LCEs the actuation temperature of the final material is intrinsically tied to the processing conditions. To orient precursors of the LCE, the precursors must be processed in a liquid crystalline phase (i.e. nematic phase). Crosslinking converts these precursors into LCEs with programmed molecular orientation but also stabilizes the nematic phase, thus increasing the transition temperature between the ordered nematic and isotropic phase. Many synthetic strategies utilize crosslinking reactions that introduce heterogeneity into the elastomer network, such as acrylate homopolymerization. This heterogeneity therefore broadens the temperature range over which the LCE changes shape. Together, these factors often combine to create materials that change shape over a relatively high and broad range of temperatures, precluding applications where these soft actuators interface with the human body and other sensitive systems.

Blueprinting molecular patterns has often relied on liquid crystalline (LC) self-assembly of the monomers, which is frozen-in by crosslinking to create the LCP, often via photopolymerization. Utilizing command surfaces, which have themselves been patterned mechanically, optically or topographically, an array of LCP director patterns can be generated[8]. Utilization of anisotropic magnetic fields to drive alignment has been resulted in 2[13] or 2.5D[13] geometries polymerized in molds, although the ability to build 3D free-forms with arbitrarily voxelated LC ordering remains elusive. Harkening back to Finkelman's method for driving alignment via mechanical stretching followed by crosslinking[6], extrusion-based methods have been pursued for additive fabrication of LCP[15,16]. Shear imposed on oligomeric inks during extrusion orients the nematic director along the print direction, which is optically crosslinked, soon after the deposition. The raster pattern, which is defined during the build sequence determines the director field during fabrication of macroscopic geometries[15,16]. All of these are of limited resolution and lack the ability to indexably define the molecular director, voxel-by-voxel.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a four-dimensional ("4D")-printing or 4D-additive manufacturing method for producing anisotropic macroscopic structures and/or anisotropic macroscopic materials having a plurality of voxels, comprising: providing or forming a first layer of a photocurable first liquid crystalline (LC) monomer; wherein the first layer of the first LC monomer has been provided or formed at a temperature falling within a nematic phase range of the first LC monomer; applying a magnetic field, having a first three-dimensional ("3D") magnetic field vector with respect to an origin point of a 3D coordinate system, to the first layer of first LC monomer or one or more of the plurality of voxels within the first layer of first LC monomer for a first dwell time, to produce in alignment with the first 3D magnetic field vector a first molecular director and/or first nematic alignment vector within the first layer of first LC monomer or within each of the one or more of the plurality of voxels within the first layer of first LC monomer; exposing the first layer of first LC monomer or the one or more of the plurality of voxels within the first layer of first LC monomer to a first dose of light radiation; wherein the first dose of light radiation has a wavelength, intensity and/or duration to polymerize the first layer of first LC monomer or the one or more of the plurality of voxels within the first layer of first LC monomer to a first polymerization depth; wherein the first molecular director and/or the first nematic alignment vector is preserved within the polymerized portion of the first layer of first LC monomer or within the polymerized portion of each of the one or more of the plurality of voxels within the first layer of first LC monomer; providing or forming a next layer of the first photocurable LC monomer and/or a photocurable second LC monomer; wherein the next layer of the second LC monomer has been provided or formed at a temperature falling within a nematic phase range of the second LC monomer; applying a magnetic field, having a next 3D magnetic field vector with respect to the origin point of the 3D coordinate system, to the next layer of second LC monomer or one or more of the plurality of voxels within the next layer of second LC monomer for a second dwell time, to produce in alignment with the next 3D magnetic field vector a next molecular director and/or a next nematic alignment vector within the next layer of second LC monomer or within each of the one or more of the plurality of voxels within the next layer of second LC monomer; exposing the next layer of second LC monomer or the one or more of the plurality of voxels within the next layer of second LC monomer to a second dose of light radiation; wherein the second dose of light radiation has a wavelength, intensity and/or duration to polymerize the next layer of second LC monomer or the one or more of the plurality of voxels within the next layer of second LC monomer to a second polymerization depth; wherein the next molecular director and/or the next nematic alignment vector is preserved within the polymerized portion of the next layer of second LC monomer or within the polymerized portion of each of the one or more of the plurality of voxels within the next layer of second LC monomer.

In another aspect of a preferred four-dimensional ("4D")-printing or 4D-additive manufacturing method of the present disclosure, the first molecular director is equal to or not equal to the next molecular director; or the first nematic alignment vector is equal to or not equal to the next nematic alignment vector, In yet another aspect of a preferred four-dimensional ("4D")-printing or 4D-additive manufacturing method of the present disclosure, the first LC monomer and the second LC monomer have respective compositions that are the same or different, In a further aspect of a preferred four-dimensional ("4D")-printing or 4D-additive manufacturing method of the present disclosure, the first dose is equal to or not equal to the second dose.

In another aspect, a preferred four-dimensional ("4D")-printing or 4D-additive manufacturing method of the present disclosure further comprises: (g) in conjunction with the step (a), forming a first part of a stimuli delivery system inclusive of a first part of a conduit for delivery of heat, light or solvent stimuli to each of the first layer and next layers and/or to each of the plurality of voxels; and (h) in conjunction with the step (d), forming a next part of the stimuli delivery system inclusive of a next part of the conduit for delivery of heat, light or solvent stimuli to each of the first layer and next layers and/or to each of the plurality of voxels.

In yet another aspect, a preferred four-dimensional ("4D")-printing or 4D-additive manufacturing method of the present disclosure further comprises: repeating steps (d)-(h) as necessary until the anisotropic macroscopic structure or the anisotropic macroscopic material is complete.

In yet another aspect of a preferred four-dimensional ("4D")-printing or 4D-additive manufacturing method of the present disclosure, the first and next molecular directors are substantially the same as, parallel to, antiparallel to or different from one, more or all of the other molecular directors; or the first and next nematic alignment vectors are substantially the same as, parallel to, antiparallel to or different from one, a plurality or all of the other nematic alignment vectors.

In another aspect of a preferred four-dimensional ("4D")-printing or 4D-additive manufacturing method of the present disclosure, the molecular director in each of the plurality of voxels of the macroscopic structure or macroscopic material is substantially the same as, parallel to, antiparallel to or different from one, a plurality or all of the other molecular directors of the others of the plurality of voxels.

In yet another aspect of a preferred four-dimensional ("4D")-printing or 4D-additive manufacturing method of the present disclosure, the nematic alignment vector in each of the plurality of voxels of the macroscopic structure or macroscopic material is substantially the same as, parallel to, antiparallel to or different from one, a plurality or all of the other nematic alignment vectors of the others of the plurality of voxels.

In yet a further aspect of a preferred four-dimensional ("4D")-printing or 4D-additive manufacturing method of the present disclosure, each of the first LC monomer and the second LC monomer has a composition comprising one or more of a diacrylate for providing temperature sensitive actuation, an azobenzene-functionalized crosslinker for providing light responsive actuation, a photoinitiator, a UV light absorber, and a visible light absorber and a polymerization inhibitor.

In yet another aspect of a preferred four-dimensional ("4D")-printing or 4D-additive manufacturing method of the present disclosure, the x, y and z dimensions of each voxel are approximately ≤50□m×50□m×50□m or wherein the x, y and z dimensions of each voxel are approximately ≤20□m×20□m×20□m.

In another aspect of a preferred four-dimensional ("4D")-printing or 4D-additive manufacturing method of the present disclosure, the first LC monomer and the second LC monomer have respective compositions that are the same or different.

Another aspect of a preferred embodiment of the present disclosure comprises an anisotropic macroscopic structure or anisotropic macroscopic material produced via additive manufacturing, comprising: one or more layers of a photo-cured liquid crystalline (LC) monomer comprising a plurality of voxels; wherein each of the plurality of voxels of has a molecular director or nematic alignment vector that is substantially the same as, parallel to, antiparallel to or different from one, a plurality or all of the other molecular directors or nematic alignment vectors of the other of the plurality of voxels.

In another aspect of a preferred anisotropic macroscopic structure or anisotropic macroscopic material of the present disclosure, a polymerization depth of the LC monomer in each of the plurality of voxels is equal with or not equal with the polymerization depth in one, a plurality or all of the others of the plurality of voxels.

In yet another aspect, a preferred anisotropic macroscopic structure or anisotropic macroscopic material of the present disclosure further comprises a stimuli delivery system inclusive of a conduit for delivery of heat, light and/or solvent stimuli to each of the plurality of voxels.

In another aspect of a preferred anisotropic macroscopic structure or anisotropic macroscopic material of the present disclosure, the stimuli delivery system was produced by additive manufacturing at the same time as the anisotropic macroscopic structure or anisotropic macroscopic material.

In another aspect of a preferred anisotropic macroscopic structure or anisotropic macroscopic material of the present disclosure, the LC monomer has a composition comprising one or more of a diacrylate for providing temperature sensitive actuation, an azobenzene-functionalized crosslinker for providing light responsive actuation, a photoinitiator, a UV light absorber, a visible light absorber and a polymerization inhibitor.

Another aspect of a preferred embodiment of the present disclosure comprises artificial muscle, soft robot, sensor or aerospace system comprising an anisotropic macroscopic structure or anisotropic macroscopic material produced via additive manufacturing, comprising: one or more layers of a photocured liquid crystalline (LC) monomer comprising a plurality of voxels; wherein each of the plurality of voxels of has a molecular director or nematic alignment vector that is substantially the same as, parallel to, antiparallel to or different from one, a plurality or all of the other molecular directors or nematic alignment vectors of the other of the plurality of voxels.)

In another aspect of a preferred artificial muscle, soft robot, sensor or aerospace system of the present disclosure, the anisotropic macroscopic structure or anisotropic macroscopic material is capable of transducing one, a plurality or all of thermal, chemical, magnetic, and light energy into mechanical work.

Another aspect of a preferred embodiment of the present disclosure comprises an anisotropic macroscopic structure or anisotropic macroscopic material produced via additive manufacturing, comprising: one or more layers of a first photocured liquid crystalline (LC) monomer comprising a first plurality of voxels; one or more layers of a second photocured liquid crystalline (LC) monomer comprising a second plurality of voxels; wherein each of the first and second plurality of voxels of has a molecular director or nematic alignment vector that is substantially the same as, parallel to, antiparallel to or different from one, a plurality or all of the other molecular directors or nematic alignment vectors of the others of the first and second plurality of voxels.

In another aspect of a preferred anisotropic macroscopic structure or anisotropic macroscopic material of the present disclosure, a polymerization depth of the LC monomer in each of voxel of the first and second plurality of voxels is equal with or not equal with the polymerization depth in one, a plurality or all of the others of the first and second plurality of voxels.

In yet another aspect, a preferred anisotropic macroscopic structure or anisotropic macroscopic material of the present disclosure further comprises a stimuli delivery system inclusive of a conduit for delivery of heat, light and/or solvent stimuli to each of the first and second plurality of voxels.

In another aspect of a preferred anisotropic macroscopic structure or anisotropic macroscopic material of the present disclosure, the stimuli delivery system was produced by additive manufacturing at the same time as the anisotropic macroscopic structure or anisotropic macroscopic material.

In yet another aspect of a preferred anisotropic macroscopic structure or anisotropic macroscopic material of the present disclosure, each of the first LC monomer and the second LC monomer has a composition comprising one or more of a diacrylate for providing temperature sensitive actuation, an azobenzene-functionalized crosslinker for providing light responsive actuation, a photoinitiator, a UV light absorber, and a visible light absorber and a polymerization inhibitor.

In another aspect of a preferred anisotropic macroscopic structure or anisotropic macroscopic material of the present disclosure, the x, y and z dimensions of each voxel are approximately ≤50□m×50□m×50□m or wherein the x, y and z dimensions of each voxel are approximately ≤20□m× 20□m×20□m.

In yet another aspect of a preferred anisotropic macroscopic structure or anisotropic macroscopic material of the present disclosure, the first LC monomer and the second LC monomer have respective compositions that are the same or different.

Another aspect of a preferred embodiment of the present disclosure comprises an artificial muscle, soft robot, sensor or aerospace system comprising an anisotropic macroscopic structure or anisotropic macroscopic material produced via additive manufacturing, comprising: one or more layers of a first photocured liquid crystalline (LC) monomer comprising a first plurality of voxels; one or more layers of a second photocured liquid crystalline (LC) monomer comprising a second plurality of voxels; wherein each of the first and second plurality of voxels of has a molecular director or nematic alignment vector that is substantially the same as, parallel to, antiparallel to or different from one, a plurality or all of the other molecular directors or nematic alignment vectors of the others of the first and second plurality of voxels.

In another aspect of a preferred artificial muscle, soft robot, sensor or aerospace system of the present disclosure, the anisotropic macroscopic structure or anisotropic macroscopic material is capable of transducing one, a plurality or all of thermal, chemical, magnetic, and light energy into mechanical work, Another aspect of a preferred embodiment of the present disclosure comprises a composition comprising: 88-99 wt. % mesogenic monomer; 0,5-2 wt. % photoinitiator; and 1-5 wt. % UV-absorber.

In yet another aspect, a preferred composition of the present disclosure further comprises 0.1-2 wt. % polymerization inhibitor, Another aspect of a preferred embodiment of the present disclosure comprises a composition comprising: 85-95 wt. % mesogenic monomer; 8-12 wt. % of a functionalized crosslinker for endowing light responsive actuation; and 0.5-2 wt. % photoinitiator.

In yet another aspect, a preferred composition of the present disclosure further comprises 0.1-0.5 wt. % of a visible light absorber.

In another aspect of a preferred composition of the present disclosure, the mesogenic monomer comprises 2-Methyl-1, 4-phenylene-bis [4[3 (acryloyloxy) propyloxy]benzoate] (RM257).

In another aspect of a preferred composition of the present disclosure, the photoinitiator comprises 2-Benzyl-2-dimethylamino-1-(4-morpholinophenyl)-butanone-1 (Irgacure 369).

In yet another aspect of a preferred composition of the present disclosure, the photoinitiator comprises Irgacure 784 (Ciba specialty chemicals).

In another aspect of a preferred composition of the present disclosure, the UV-absorber comprises 2-(2H-Benzotriazol-2-yl)-4,6-di-tert-pentylphenol (Tinuvin 328).

In another aspect of a preferred composition of the present disclosure, the photoinitiator comprises 2-Benzyl-2-dimethylamino-1-(4-morpholinophenyl)-butanone-1 (Irgacure 369); and wherein the UV-absorber comprises 2-(2H-Benzotriazol-2-yl)-4,6-di-tert-pentylphenol (Tinuvin 328).

In another aspect of a preferred composition of the present disclosure, the polymerization inhibitor comprises methylhydroquinone.

In yet another aspect of a preferred composition of the present disclosure, the photoinitiator comprises 2-Benzyl-2-dimethylamino-1-(4-morpholinophenyl)-butanone-1 (Irgacure 369); wherein the UV-absorber comprises 2-(2H-Benzotriazol-2-yl)-4,6-di-tert-pentylphenol (Tinuvin 328); and wherein the polymerization inhibitor comprises methylhydroquinone.

In another aspect of a preferred composition of the present disclosure, the functionalized crosslinker for endowing light responsive actuation comprises 4,4'-di(6-(acryloxy)-hexyloxy)azobenzene (Azo 6c).

In another aspect of a preferred composition of the present disclosure, the visible light absorber comprises Methyl red (2-(4-Dimethylaminophenylazo)benzoic acid, 4-Dimethylaminoazobenzene-2'-carboxylic acid, Acid Red 2 purchased from Sigma-Aldrich).

Another aspect of a preferred embodiment of the present disclosure comprises a composition comprising: 98 wt. % mesogenic monomer; 1 wt. % photoinitiator; and 1 wt. % UV-absorber.

A further aspect of a preferred embodiment of the present disclosure comprises a composition comprising: 98,5 wt. % mesogenic monomer; 0.5 wt. % photoinitiator; and 1 wt. % UV-absorber, Another aspect of a preferred embodiment of the present disclosure comprises a composition comprising: 95 wt. % mesogenic monomer; 1 wt. % photoinitiator; and 4 wt. % UV-absorber.

Yet another aspect of a preferred embodiment of the present disclosure comprises a composition comprising: 97.5 wt. % mesogenic monomer; 1 wt. % photoinitiator; 1 wt. % UV-absorber; and 0.5 wt,% polymerization inhibitor, Another aspect of a preferred embodiment of the present disclosure comprises a composition comprising: 89 wt. % mesogenic monomer; 10 wt. % of a functionalized cross-linker for endowing light responsive actuation; and 1 wt. % photoinitiator.

Another aspect of a preferred embodiment of the present disclosure comprises a composition comprising: 88.9 wt. % mesogenic monomer; 10 wt. % of a functionalized cross-linker for endowing light responsive actuation; 1 wt,% photoinitiator; and 0.1 wt, % of a visible light absorber, Another aspect of a preferred embodiment of the present disclosure comprises a system for four-dimensional ("4D")-printing or 4D-additive manufacturing of anisotropic macroscopic structures and/or anisotropic macroscopic materials comprising one or more photocured liquid crystalline (LC) monomers having a plurality of voxels, wherein each of the plurality of voxels of has a molecular director or nematic alignment vector that is substantially the same as, parallel to, antiparallel to or different from one, a plurality or all of the other molecular directors or nematic alignment vectors of the other of the plurality of voxels, comprising: a build plate; a motorized translation stage for moving and controlling the position of the build plate; one or more magnets mounted on a motorized rotation stage for rotating the one or more magnets about or around the build plate to impose and control a direction of a magnetic field about or around the build plate; a DMD irradiation projector having a lens; wherein the lens is mounted in line with the build plate; a heating system for controlling the LC monomer temperature during printing; wherein the heating system comprises a ring disc heater, temperature controller, one or more thermocouples and a thermometer; and wherein the ring disc heater has an opening through which the lens of the DMD projector extends; a bottom window disposed above the lens of the DMD projector; a rig assembly or frame for integrating the build plate and its motorized translation stage, the one or more magnets mounted on the motorized rotation stage; the DMD projector and lens; the heating system and bottom window.

In another aspect of a preferred system for four-dimensional ("4D")-printing or 4D-additive manufacturing of anisotropic macroscopic structures and/or anisotropic macroscopic materials of the present disclosure, the bottom window comprises a clear acrylic sheet.

In another aspect of a preferred system for four-dimensional ("4D")-printing or 4D-additive manufacturing of anisotropic macroscopic structures and/or anisotropic macroscopic materials of the present disclosure, the bottom window is coated with PDMS (Sylgard 184 Dow Corning 184 Silicone Elastomer).

In another aspect of a preferred system for four-dimensional ("4D")-printing or 4D-additive manufacturing of anisotropic macroscopic structures and/or anisotropic macroscopic materials of the present disclosure, the motorized translation stage controls the movement and position of the build plate in one or more axes.

In another aspect of a preferred system for four-dimensional ("4D")-printing or 4D-additive manufacturing of anisotropic macroscopic structures and/or anisotropic macroscopic materials of the present disclosure, the motorized rotation stage is capable of controlling rotation of the one or more magnets about one or more axes.

In another aspect of a preferred system for four-dimensional ("4D")-printing or 4D-additive manufacturing of anisotropic macroscopic structures and/or anisotropic macroscopic materials of the present disclosure, the DMD projector has no UV filters.

In another aspect of a preferred system for four-dimensional ("4D")-printing or 4D-additive manufacturing of anisotropic macroscopic structures and/or anisotropic macroscopic materials of the present disclosure, the build plate has been spin-coated with Elvamide (DuPont) to achieve adhesion between the cured material and the build plate.

In another aspect of a preferred system for four-dimensional ("4D")-printing or 4D-additive manufacturing of anisotropic macroscopic structures and/or anisotropic macroscopic materials of the present disclosure, the build plate has been rubbed in one or more directions to impose an alignment on mesogens within the LC monomer close to the build plate.

Another aspect of a preferred embodiment of the present disclosure comprises an artificial muscle or soft robot comprising an anisotropic macroscopic structure and/or anisotropic macroscopic material comprising: one or more layers of a photocured liquid crystalline (LC) monomer comprising a plurality of voxels; wherein each of the plurality of voxels of has a molecular director or nematic alignment vector that is substantially the same as, parallel to, antiparallel to or different from one, a plurality or all of the other molecular directors or nematic alignment vectors of the other of the plurality of voxels; wherein the muscle or soft robot is capable compound movement such as the ability to change shape and/or length, either simultaneously or non-simultaneously and/or such as the ability to extend and twist simultaneously and/or to contract and twist simultaneously.

BRIEF DESCRIPTION OF THE DRAWINGS

The present disclosure is illustrated by way of example and not limitation in the figures of the accompanying drawings, in which.

DETAILED DESCRIPTION

Figure 1A:
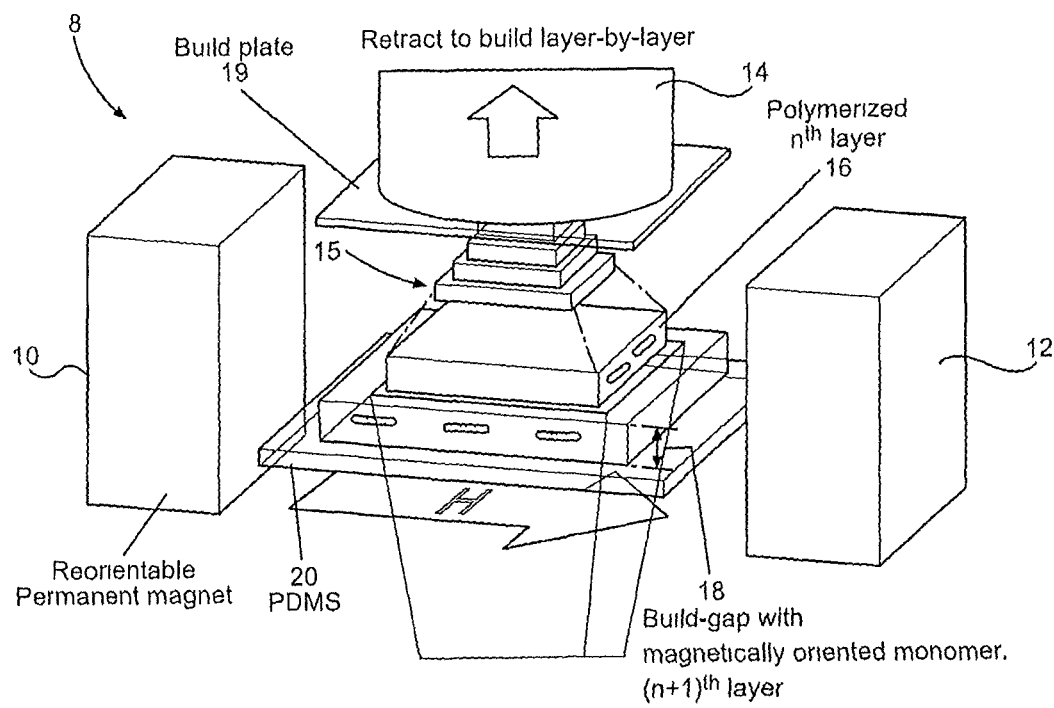
FIG. 1A shows a schematic of a layer-by-layer 3D printing system of the present disclosure capable of fabricating three dimensional geometries with molecular alignment encoded using a magnetic field.

The following description, taken in conjunction with the referenced drawings, is presented to enable one of ordinary skill in the art to make and use the disclosure and to incorporate it in the context of particular applications. Various modifications, as well as a variety of uses in different applications, will be readily apparent to those skilled in the art, and the general principles, defined herein, may be applied to a wide range of aspects. The present disclosure is not intended to be limited to the aspects disclosed herein. Instead, it is to be afforded the widest scope consistent with the disclosed aspects.

The present disclosure presents a framework for breaking out of the confines of prior approaches by exploiting the combination of anisotropic magnetic susceptibility of the LC monomers and spatially-selective photopolymerization using a digital micromirror device (DMD) in a bottom-up (inverted) 3D-printing configuration. The system 8 illustrated in FIG. 1A and FIG. 7 utilizes an indexable 300 mT magnetic field (H) generated using permanent magnets 10, 12, which are mounted on a rotation stage to drive alignment of the LC monomers. A DMD system 14 (Vivitek D912HD projector) with a pixel resolution of ~50μm polymerizes desired regions to preserve this orientation with spatial selectivity. Independently dictating the alignment using a reorientable magnetic field and polymerizing as needed to build a 3D free-form layer-by-layer allows for fabricating structures, where the molecular alignment and the geometry can be defined in a truly voxel-by-voxel fashion. Furthermore, during the fabrication of each layer 16, the monomer is confined in a build-gap 18 between the prior polymerized layer (or the build plate 19, if it is the first layer) and a PDMS (Polydimethylsiloxane) substrate 20. After selective polymerization under the influence of a reorientable magnetic field, the polymerized layer is detached from the PDMS substrate 20 by retracting the build-plate 19 to create the subsequent build-gap 18. The sample 15 remains attached to the build-plate 19 during the build process and after each retraction of the build-plate 19 a fresh monomer mixture (of same or different composition) is introduced. The process is then repeated. This framework also allows for arbitrary modulation of the composition of the material from one layer to another. Functional gradations become possible to integrate multi-responsiveness in a facile manner to create response profiles, which were hitherto inaccessible.

INTRODUCTION

Regulating functional properties and directing structural evolution in active polymers by programming composition and microstructural gradients during fabrication is a versatile route for realizing soft machines. Integrating active elements with suspensory structures, including fluidic[1] and solid[2] mechanical logic elements has been used to encode macroscopic actuation and manipulation in soft robots. If individual voxels of a material themselves become capable of active functionalities, a broader design-space of encodable responses can emerge by blurring distinction between the active and the suspensory, structural elements. The material itself, becomes the robotic manipulator. For example, programming anisotropic magnetic domain structures in magnetic particle-infused polymeric inks can enable soft robots, which manifest non-linear shape transformations using magnetic fields[3] Biomimetic transformations have also been realized via anisotropic swelling in structures 3D printed with aligned nano-cellulose fibers[4] The underlying organizing principle is to exercise voxel-by-voxel control over both the geometry and the anisotropic coupling between a stimulus and material response, When responsiveness, geometry and mechanics conspire, emergent design opportunities become possible.

Liquid crystalline polymers (LCP) are distinguished among stimuli responsive materials due to their ability to reversibly generate work densities in excess of ~J/kg with unusual force-displacement characteristics. Notably, the ability to simultaneously generate large strains (10's %) and actuation stresses (100's kPa) from order-disorder transitions of the long-range orientational order in the macromolecular network[5-7]. Actuation can be induced using a range of stimuli, including heat, light and solvent[8-9]. Typically, principal directions of actuation strains are derived from the anisotropy of the molecular director—contractile strains are generated parallel to the director and tensile strains emerge perpendicular to it[10]. Blueprinting spatially heterogeneous molecular patterns to direct the large work potential is a compelling feature of the LCP[9]. This allows for their utilization in actuators across length-scales ranging from the micrometer- to the macroscopic-scale[11-13]. Furthermore, exploiting the competition between bending/stretching in slender objects allows for eliciting the rare combination of high-force/large-displacement actuation from hitherto small form-factor actuators[13].

Blueprinting molecular patterns has often relied on liquid crystalline (LC) self-assembly of the monomers, which is frozen-in by crosslinking to create the LCP, often via photopolymerization. Utilizing command surfaces, which have themselves been patterned mechanically, optically or topographically, an array of LCP director patterns can be generated[9]. Utilization of anisotropic magnetic fields to drive alignment has be resulted in $2^{14}$ or $2.5D^{15}$ geometries polymerized in molds, although the ability to build 3D free-forms with arbitrarily voxelated LC ordering remains elusive. Harkening back to Finkelman's method for driving alignment via mechanical stretching followed by crosslinking[6], extrusion-based methods have been pursued for additive fabrication of LCP[16-18]. Shear imposed on oligomeric inks during extrusion orients the nematic director along the print direction, which is optically crosslinked, soon after the deposition. The raster pattern, which is defined during the build sequence determines the director field during fabrication of macroscopic geometries[16-18].

Exploiting the full potential of LCP in adaptive structures and mechanisms requires an ability to define the molecular orientation, voxel-by-voxel during the fabrication of a 3D free-form, Doing so, holds the key to encoding arbitrary transformations of 3-dimensional geometries along predefined target metrics[19], which is defined for each voxel. This unlocks a pathway for designing transformable 3D geometries, including complex active kinematic and mechanical logic units, biomimicking actuators and harnessing magnified actuation profiles in soft robotics, Current fabrication approaches constrain the ability to access this 3D design space. The command surface-based methods are intrinsically limited to flat geometries (typically films <100 µm), necessitating lamination-based assembly for scaling the responsiveness[20], Fabrication in molds limits geometries to those, which can be reliably extracted following polymerization[14-15]. Deposition-based methods can generate arbitrary geometries, but they cannot decouple molecular patterning from the build sequence[16-18]. Contrast deposition-based methods against an approach, where the molecular orientation can be independently defined with say, 1° resolution per 50µm element. For a 1 mm segment, the latter method offers a design-space, which is larger by a factor of $\sim 10^{40}$ in comparison to the deposition-based method. Assuming, 180° is available with 1° resolution per 50µm length, the total number of design permutations is $180^{(1000/50)}\sim 10^{40}$. For a 1 mm$^3$ volume, the design space is larger by a googol.

Here, we present a framework for breaking out of the confines of prior approaches by exploiting the combination of anisotropic magnetic susceptibility of the LC monomers and spatially-selective photopolymerization using a digital micromirror device (DMD) in a bottom-up (inverted) 3D-printing configuration. The system illustrated in FIG. 1A (see also FIG. 7, Supporting Information) utilizes an indexable 300mT magnetic field (H) generated using permanent magnets 10, 12, which are mounted on a rotation stage to drive alignment of the LC monomers. A DMD system 14 (Vivitek D912HD projector) with a pixel resolution of ~50µm polymerizes desired regions to preserve this orientation with spatial selectivity. Independently dictating the alignment using a reorientable magnetic field and polymerizing as needed to build a 3D free-form layer-by-layer allows for fabricating structures 15, where the molecular alignment and the geometry can be defined in a truly voxel-by-voxel fashion. Furthermore, during the fabrication of each layer 16, the monomer is confined in a build-gap 18 between the prior polymerized layer 16 (or the build plate 19, if it is the first layer) and a Polydimethylsiloxane (PDMS) substrate 20. After selective polymerization under the influence of a reorientable magnetic field, the polymerized layer is detached from the PDMS substrate 20 by retracting the build-plate 19 to create the subsequent build-gap 18. The sample 15 remains attached to the build-plate 19 during the build process and after each retraction of the build-plate 19 a fresh monomer mixture (of same or different composition) is introduced. The process is then repeated. This framework also allows for arbitrary modulation of the composition of the material from one layer to another. Functional gradations become possible to integrate multi-responsiveness in a facile manner to create response profiles, which were hitherto inaccessible.

Building LCP in this fashion encounters a constraint where a given voxel or a layer influences the patterning in a neighboring element, which is subsequently built. Consider the example of a multi-layered geometry in FIG. 1A, where layer n has an orientation, which is transverse to that in the monomer in the build-gap below it. The monomer will eventually become layer n+1 with an orientation determined by the magnetic field. The spatial extent to which the alignment in the layer n+1, will be influenced by the anchoring from layer n will determine the finest resolution capable with this platform. This is essentially parameterized by De Gennes's magnetic coherence length (ζ) which for a 300 mT magnetic field is $$\xi = \frac{1}{H}\sqrt{\frac{K_{22}}{Xa}} \ll 10\mu m,$$

assuming $K_{22} \sim 10^{-7}$ dyne (twist Frank constant) and $x_a \sim 10^{-7}$ (the anisotropy of magnetic susceptibility in c.g.s.)[21-22]. In a typical voxel 50 µm×50 µm×50µm, when the characteristic dimensions are much larger than ζ, the effect of anchoring from adjacent voxels declines exponentially and the alignment will be essentially dictated by the magnetic field[21]. Hence, for the resolutions targeted here, this platform becomes viable for layer-by-layer fabrication of molecularly-ordered free-forms, where within each layer 16, the director can be controlled voxel-by-voxel.

Figure 1B:
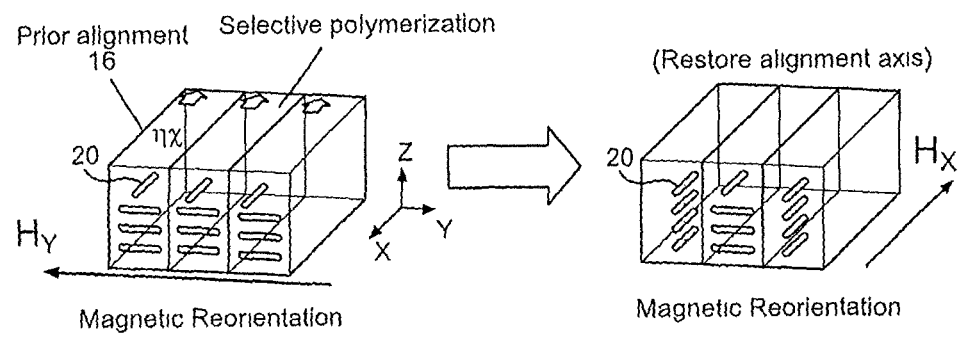
FIG. 1B shows an example of control over the molecular director within a given layer using the system of FIG. 1A.
Figure 1C:
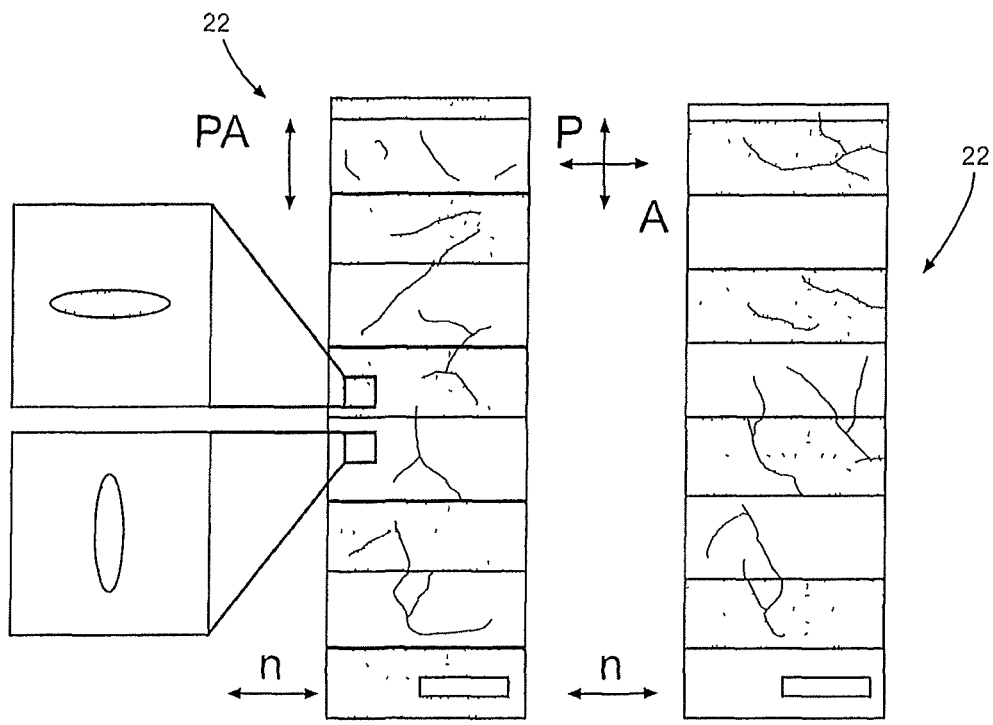
FIG. 1C shows polarized optical microscopy (POM) images of a sample with mutually orthogonal molecular orientation, which was generated using the system of FIG. 1A.
Figure 1D:
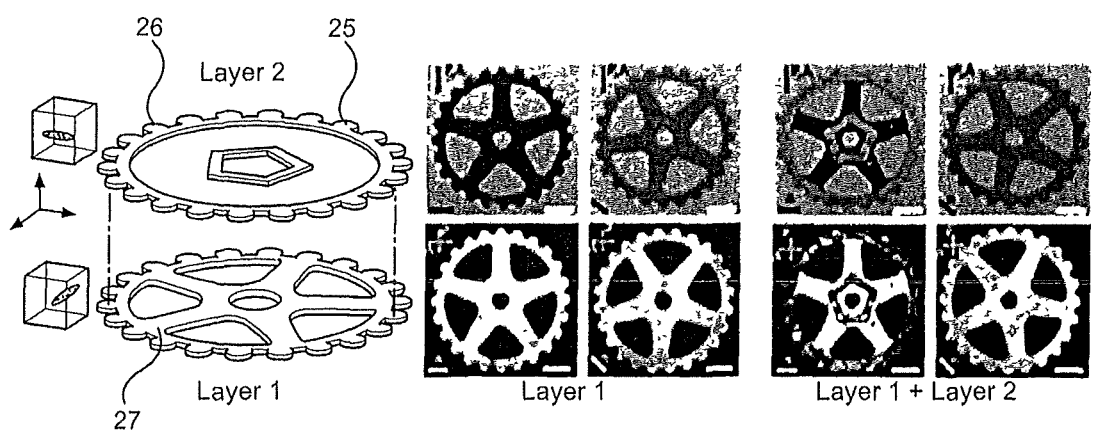
FIG. 1D shows the ability of a preferred system of the present disclosure to pattern arbitrary features, while achieving molecular alignment by printing a bilayered.

FIG. 1A shows a schematic of a layer-by-layer 3D printing system 8 capable of fabricating three dimensional geometries 15 with molecular alignment encoded using a magnetic field. Reorienting the magnetic field on demand and spatially selective polymerization using a DMD light source 14 allow for independently indexing the molecular orientation voxel-by-voxel. See also FIG. 7 for an illustration of the physical setup of system 8 of the present disclosure, FIG. 1B shows an example of control over the molecular director within a given layer 16. A build-plate with an alignment layer is used to trigger a preferred alignment direction. Application of a magnetic field reorients this alignment, which is selectively frozen-in via crosslinking. Then, the magnetic field is rotated to coincide with the prior orientation, following which crosslinking is used to preserve the patterning. FIG. 1C shows polarized optical microscopy (POM) images 22 of the sample with mutually orthogonal molecular orientation, which was generated using the steps described with respect to FIG. 1B above. The regions with uniaxial alignment are bright (maximum light transmission through the material) at 0 degree and dark (less light transmission) at 45 degree under parallel polarizers (images in the left) and dark at 0 degree and bright at 45 degree under crossed polarizers (images in the right). Other regions are characterized by a pattern, which is rotated through the thickness, FIG. 1D shows the ability of system 8 of the present disclosure to pattern arbitrary features, while achieving molecular alignment by printing a bilayered gear-shaped structure 25. The exploded view of the structure and the director orientation for each layer is shown. The build plate, similar to FIG. 1B and FIG. 1C, is composed of a rubbed elvamide layer, which enforces a preferred orientation. The first layer 26 is created by applying a magnetic field orthogonal to this orientation, which leads to a rotation of the director. Second layer 27, which consists of the hub and teeth of the gear is rotated with respect to the first layer to reset the alignment with respect to the rubbing direction on the build-plate. The images on the right are POM images of the first layer and the final bilayer structure at 0 degree and 45 degree under parallel and crossed polarizer (P) and analyzer (A) (All scale bars=1 mm).

This platform does not restrict the molecular director to a fixed orientation in a given layer. FIG. 1B, illustrates the creation of multiple nematic orientations in different voxels of a single layer. To demonstrate the idea, a glass build-plate was spin-coated with Elvamide (DuPont) and rubbed to create a surface anchoring condition (along $n_x$) to emulate a mer was then used to generate a striped sample with alternating layers of uniform alignment along $n_x$ in some regions and rotated nematic patterns in the rest. FIG. 1C illustrates the polarized optical microscopy (POM) images of a single layer built using this idea. The parallel and crossed polarized images illustrate regions where the director patterns are all aligned along $n_x$ or are rotated perpendicular with respect to n by the magnetic field.

At this point, it becomes possible to marry spatially-selective polymerization with spatially-resolved blueprinting of the director patterns to build geometries layer-by-layer. FIG. 1D illustrates a two-layered gear-shaped structure 25. Here, the first layer 26 is characterized by planar orientation of the nematic director (perpendicular to the rubbing direction), where the corresponding geometric profile is selectively built. Then, the built-plate is raised, monomer is introduced into the build-gap and the magnetic field is oriented transverse to this orientation. Then, the teeth and the hub are selectively polymerized with the rotated orientation. The POM images were recorded after the first layer 26 was built and after both layers 26, 27 were created. FIG. 1D illustrates images with both crossed polarizers (polarizer P perpendicular to analyzer A) and with P parallel to A for each case.

TABLE 1

Figure 2A:
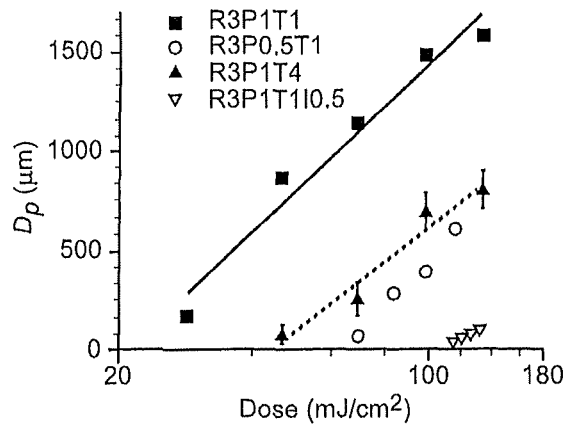
FIGS. 2A-2B show polymerization depth as function of irradiation energy dosage for various compositions of the present disclosure.
Figure 2B:
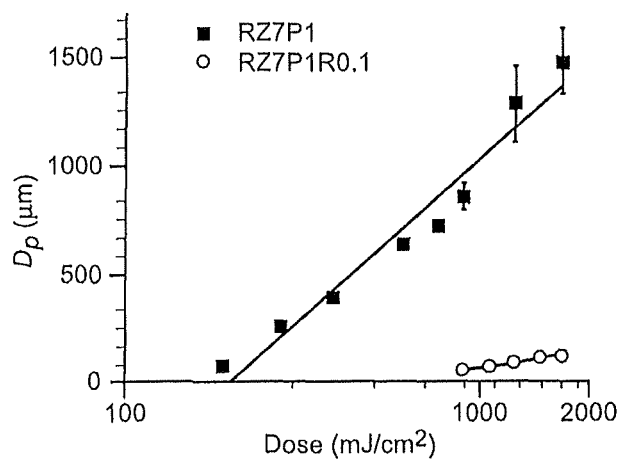

Heat and light responsive monomer mixtures of various compositions, their curing temperature and parameters characterizing their working curves in FIGS. 2A-2B.

| Monomer Mix | RM257 [wt %] | Azo 6 C [wt %] | I369 Photo-Initiator [wt %] | I784 Photo-Initiator [wt %] | Tinuvin (UV light absorber) [wt %] | Methyl Red (visible light absorber) [wt %] | Inhibitor Methyl-hydroquinone [wt %] | Curing Temp. [° C.] | $Q_c$ [mJ/cm³] | $D_0$ [μm] |
|---|---|---|---|---|---|---|---|---|---|---|
| R3P1T1 | 98 | 0 | 1 | 0 | 1 | 0 | 0 | 100 | 20.8 ± 3 1 | 909 ± 105 |
| R3P0.5T1 | 98.5 | 0 | 0.5 | 0 | 1 | 0 | 0 | 100 | 66.0 ± 2.2 | 1083 ± 80 |
| R3P1T4 | 95 | 0 | 1 | 0 | 4 | 0 | 0 | 100 | 44.1 ± 5 | 740 ± 116 |
| R3P1T1I0.5 | 97.5 | 0 | 1 | 0 | 1 | 0 | 0 5 | 100 | 105.3 ± 2.6 | 352 ± 50 |
| RZ7P1 | 89 | 10 | 0 | 1 | 0 | 0 | 0 | 95 | 194.6 ± 23.1 | 628 ± 56 |
| RZ7P1R0.1 | 88 9 | 10 | 0 | 1 | 0 | 0.1 | 0 | 95 | 565.1 ± 24.4 | 113 ± 6 | prior layer and it is positioned 50 μm away from a PDMS substrate. A monomer mixture (R3P1T4 in Table 1) composed of 95 wt. % mesogenic monomer RM257 (2-Methyl-1,4-phenylene-bis[4[3(acryloyloxy) propyloxy]benzoate]), 1 wt. % photoinitiator Irgacure 369 (2-Benzyl-2-dimethyl-amino-1-(4-morpholinophenyl)-butanone-1) and 4 wt,% UV-absorber Tinuvin 328 (2-(2H-Benzotriazol-2-yl)-4,6-di-tert-pentylphenol) was introduced in the build-gap. A constant temperature of 100° C. was maintained and a 300 mT magnetic field was applied perpendicular (in plane) to the surface anchoring direction for 300 s (dwell time). Selective photopolymerization (with 0.8 s exposure and 170 mW cm$^{-2}$) using the DMD system was used to crosslink regions with a director pattern, which is rotated by $\pi/2$ with respect to the prior alignment. After which, the magnetic field was rotated to restore the axis with $n_x$ in the =polymerized regions. Meanwhile alignment of the already crosslinked regions remains fixed. Crosslinking of the remaining mono- Parenthetically, we note the presence of a temperature window for orienting and polymerizing the mesogenic monomers without requiring any temperature cycling. The ability to 3D print molecularly-ordered polymers at a constant temperature eliminates in-process deformation of the responsive material and added process-time due to the heating-cooling cycles. Often, temperature cycling into the isotropic state of the monomer followed by cooling into the nematic state in the presence of an orienting field has been used[15,23]. Eliminating this thermal cycling decreases the possibility of thermal curing of the monomer during the printing.

Results and Discussion

Figure 2C:
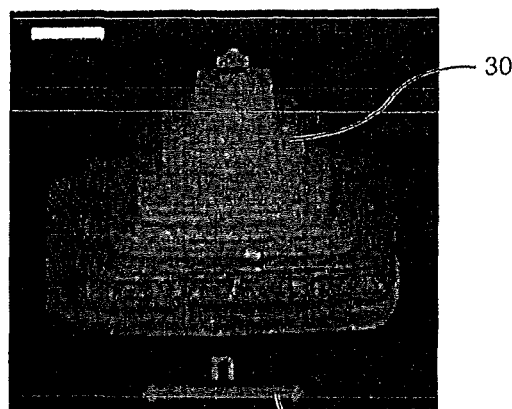
FIG. 2C illustrates a scalable fabrication of molecularly-ordered solids created with individual 100 μm layers according to the present disclosure.

When seeking to create complex geometries with highly defined structural features, the ability to control the polymerization depth in individual polymerized voxels becomes critical. We find that the interplay of the optical absorption of absorbing dyes and relative concentrations of photoinitiator and inhibitor of polymerization provides control over the depth to which crosslinking occurs within the build-gap. But for this control, as the material is built, unintended polymerization can occur, especially when overhanging structures are fabricated in subsequent layers. To achieve this control, while simultaneously achieving molecularly-ordered LCP, a range of monomer mixtures were developed. RM257, a diacrylate, was used as the host-mesogen, which generate temperature sensitive actuation. Doping with an azobenzene-functionalized crosslinker (Azo6c) endows light responsive actuation. Details can be found in the experimental section. For the compositions shown in Table 1, the polymerization depth ($D_p$) is found to be a function of the photonic energy dosage (~I t), where I is the intensity and t is the exposure time. We utilize the scaling relation: $D_p = D_0 \ln(I t/Q_c)$, where $D_0$ and $Q_c$ are constants characteristic of the monomer mixture [24]. FIG. 2A illustrates the "working curves" for the various compositions in Table 1. $D_0$ encapsulates the effect of attenuation of light through the monomer and its effect on the depth to which polymerization occurs. An effective approach for controlling this parameter is via the addition of the absorbing dyes. For thermally-responsive RM257-based resins (FIG. 2A), controlling the concentration of the UV absorber (Tinuvin) leads to a smaller $D_0$, See FIG. 2A for comparison of R3P1T1 vs. R3P1T4, where the slope of the working curve is smaller with increasing UV absorber. The effect of the photoinitiator on the slope, however is small as seen from the comparison of R3P1T1 vs R3P0,5T1. These systems are polymerized using Irgacure 369 (Ciba) as photoinitiator and using unfiltered irradiation from the projector, which has components from UV to visible. In contrast, the azobenzene-functionalized materials are polymerized using light filtered with a 495nm long-pass filter to avoid isomerizing the azobenzene during the polymerization. Here, Irgacure 784 (Ciba) is used as the photoinitiator and Methyl Red is used as the absorber. The working curves for the photoresponsive resins are illustrated in FIG. 2B. We identify compositions and processing conditions to overcome challenges in the incorporation of photochromic molecules, which modify the stability of the mesophase and present challenges in crosslinking monomers with spatial selectivity to preserve the molecular order[25-26]. The constant $Q_c$ in FIGS. 2A-2B is correlated with minimum energy density that is required to start the polymerization, which increases when the amount of photoinitiator is decreased. This can be seen by comparing $Q_c$ for R3P1T1 vs R3P0.5T1. Similar increase in the $Q_c$ is observed when a polymerization inhibitor (methylhydroquinone) is added in the composition R3P1T1I0.5. Increasing $Q_c$ leads to a shifting of the working curves to the right, wherein the intercept along the x-axis (energy dose) increases. These calibration curves enable the scalable fabrication of molecularly-ordered freeforms at scales, which outstrip conventional cell-based fabrication methods, while also enabling precise control over the geometry. FIG. 2C illustrates a pyramid-like structure 30 fabricated with R3P1T1, where the molecular director (n) throughout the sample is oriented along the indicated arrow 31. The pyramid 30 is 3.8 mm high made of 38 layers with 100 μm layer thickness. Access to molecular patterned structures at these scales holds the key to magnifying the work-potential and the utility of LCP actuators in practical systems.

FIGS. 2A-2B show polymerization depth as function of irradiation energy dosage for various compositions in Table 1; heat responsive LCP mixtures in FIG. 2A and azobenzene-functionalized light responsive mixtures in FIG. 2B. FIG. 2C illustrates a scalable fabrication 30 of molecularly-ordered solids created with individual 100 μm layers. The direction of the nematic director in the structure fabricated with fabricated with R3P1T1 is illustrated via the blue arrow 31 (scale bar=1 mm).

The ability to fabricate molecularly-ordered freeforms allows for harnessing non-linear mechanics to enable new pathways for shape selection. Consider, a bilayered structure flat strip printed using R3P1T1 in FIG. 3A, where a uniformly oriented monodomain sample of 50 μm in thickness resides on randomly oriented substrate of 50 um thickness. The monodomain sample is created by polymerizing the strip 36 under a stationary magnetic field, while the random polydomain portion is created by polymerizing in the absence of a magnetic field. The width of the sample in the third dimension is 0.5 mm. The monodomain portion will respond by shrinking along the long-axis, while the polydomain sample produces no net strain. As a result, heating the sample leads to a curvature of the bilayer 37 ($\kappa$=0.98 mm$^{-1}$), as illustrated. The ability to directly fabricate complex geometries to exploit mechanical non-linearities that elicit unusual shape transformations, a bilayer basket-shaped configuration 38 was printed. Here, a ring-shaped structure was printed, segment-by-segment (see FIG. 8), with the director pattern, which is azimuthally oriented. This ring can also be thought of as an annular section of a +1 topological defect[13]. This was integrated with a subsequent layer, which was printed with a square weave hatched pattern and a polydomain alignment, in the absence of a magnetic field.

This composite structure allows for exploiting the idea of overcurvature to create geometries with a Gaussian curvature, even when starting from a prior flat state[27]. While a bilayered flat strip will bend when heated, confining the bilayer into a closed ring with a curvature orthogonal to that generated with heat can trigger buckling out of the plane. While this has been explored in the buckling of rods[27], here, we exploit our fabrication platform to drive transformations of surfaces from a flat state into one characterized by a negative Gaussian curvature. The overcurvature is defined by the parameter $O_p = \sqrt{1+(\kappa R)^2}$. Where $\kappa$ is the curvature caused by the heat actuation (same as the curvature of the flat bilayered strip after heating) and is orthogonal to the in-plane curvature $R^{-1}$ [27]. At room temperature $O_p$=1 ($\kappa$=0), the geometry is flat with an initial curvature $R^{-1}$. R=2.6 mm in FIG. 3A. By increasing the temperature ($\kappa$>0), the ring generates an orthogonal curvature $\kappa$. As the periphery of the sample buckles out of plane to minimize the bending and torsional energies, the hatched surface 39 is forced by the constraints along its periphery into a negative Gaussian curved shape. By modifying the value of R, differing levels of overcurvature can be accessed to create a range of geometries following thermal stimulation (see FIGS. 9A-9B, Supporting Information).

Figure 3A:
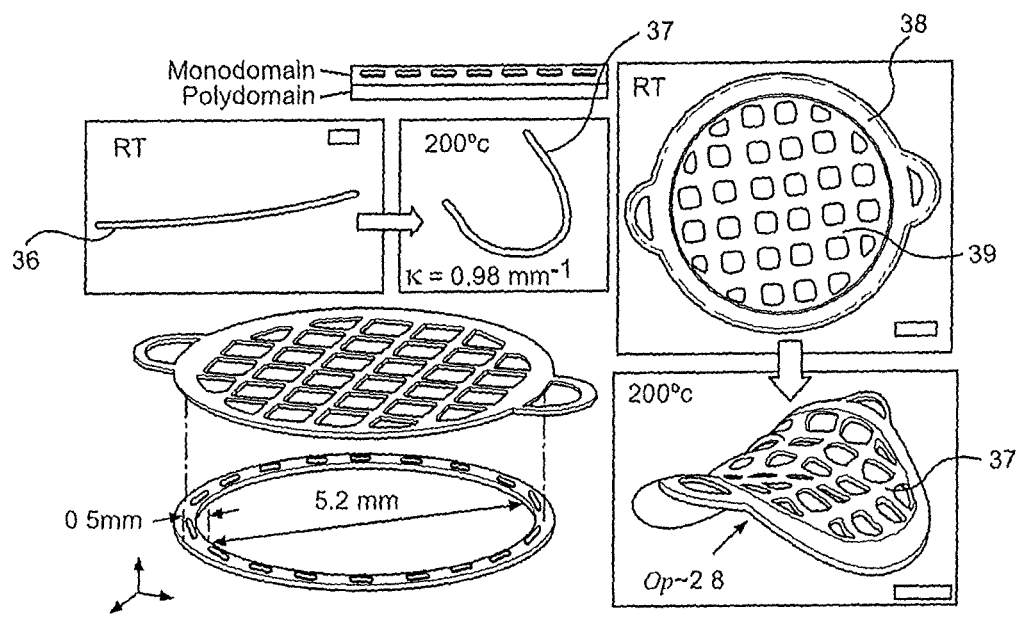
FIG. 3A shows harnessing the response of a 3D printed bilayered actuator in overcurvature-driven assembly of Gaussian curved geometries in a preferred composition of the present disclosure.
Figure 3B:
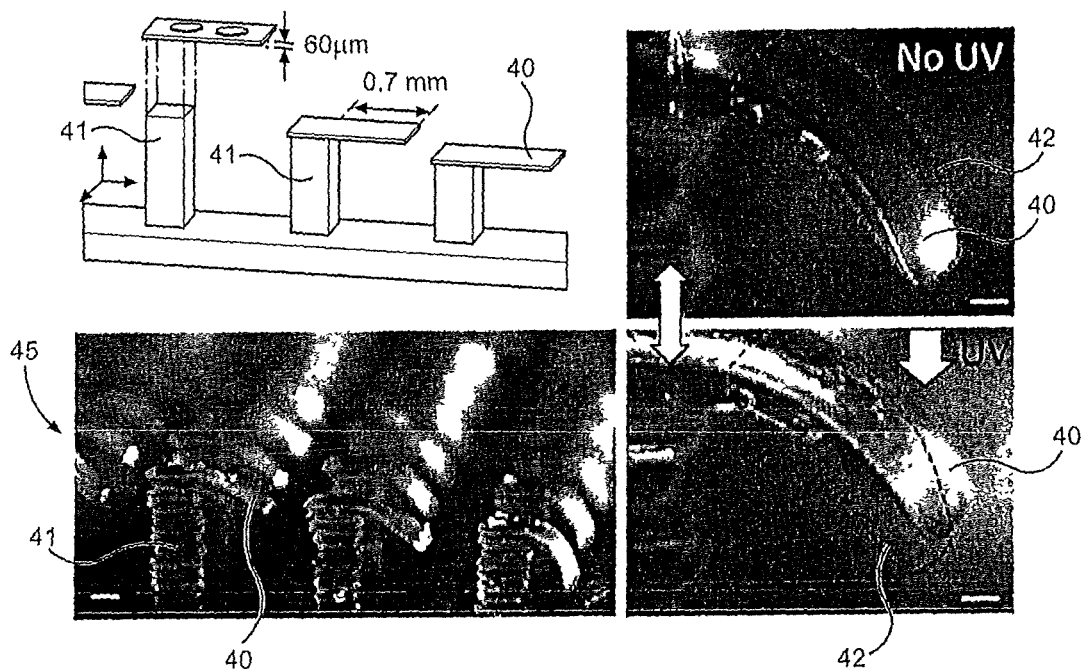
FIG. 3B shows light responsive array of microstructures fabricated in accordance with the present disclosure using a preferred composition of the present disclosure.

Monomer system RZ7P1R0.1 was used to demonstrate the fabrication of light responsive microstructures in FIG. 3B. Azobenzene-functionalized mixtures result in a glassy LCP, which respond to irradiation with 365 mn UV by bending towards the actinic light[28]. The ability to spatiotemporally modulate the actinic light to direct actuation in microstructures is particularly attractive for creating functional surfaces and active topographies. In contrast to prior approaches, involving cholesteric self-assembly[9] or micromolding[11], the design space possible with the 3D printing approach is broader, including opportunities creating reentrant microstructures, which are capable of unusual properties (e.g. robust superomniphobic responses[29]). FIG. 3B illustrates an 8×6 array of overhanging cantilevers 40 mounted on pillars 41 with different heights (also see supplementary FIG. 10A). The idea is to demonstrate fine structures composed of reentrant features, which are responsive to light. This system was polymerized using light filtered with a 495 nm long-pass filter to avoid isomerizing the azobenzene during the polymerization. The pillars 41 have polydomain molecular orientation and the molecular directors in the monodomain cantilevers are aligned parallel to their long axis as illustrated in FIG. 3B. Cantilevers 40 are 60 μm thick and 700 μm long. During the sample development to wash off residual monomers after finishing the printing process, the capillary forces from the solvent bent the cantilevers 40 downward. This can be solved by utilizing support structures, which are removed after the development. When, this structure is irradiated from the top, the absorption of light by the overhanging cantilevers 40 leads to their bending towards the light. The deflection is illustrated by tracking the outline 42 of the cantilever 40 as illustrated in FIG. 3B (also, see SI Movie 1). Graded contractile strains (~−1,8% strain on the exposed side) are generated along the nematic director, which generates the bending. Strains were calculated by measuring the change in the curvature of the cantilevers (ΔK) and the initial bending angel (α). After the UV light was turned off, the cantilever spontaneously relaxed to its initial shape after ~30 minutes at ambient temperature. The ability to fabricate such responsive microstructures along arbitrary surface profiles can hold the key to modulating functional responses, including hydrophobicity, fluid drag and biological responses.

FIG. 3A shows harnessing the response of a 3D printed bilayered actuator in overcurvature-driven assembly of Gaussian curved geometries in R3P1T1. A strip 36 composed of a uniformly oriented LCP residing on a polydomain LCP (printed without applying a magnetic field) generates a curvature (κ), when stimulated with heat. However, creating an annular geometry with an azimuthally-patterned director, which resides on a hatch-patterned suspensory structure 39 (polydomain) elicits the creation of a Gaussian curved saddle-like geometry 37, when heated (scale bars=1 mm). The exploded view of the hitherto flat geometry, before heating, is also illustrated. FIG. 3B shows light responsive array 45 of microstructures fabricated with RZ7P1R0.1. The overhanging cantilevers 40 are monodomain, while the vertical pillars 41 are polydomain. Irradiation with 365 nm UV elicits a bending of the cantilevers 40. Red dashed outlines 42 indicate the initial shape of the cantilever 40 before the actuation (scale bar of the array image=200 μm, scale bars of a single cantilever 40 on the right=50 μm). Also, see SI Movie 1.

Figure 4A:
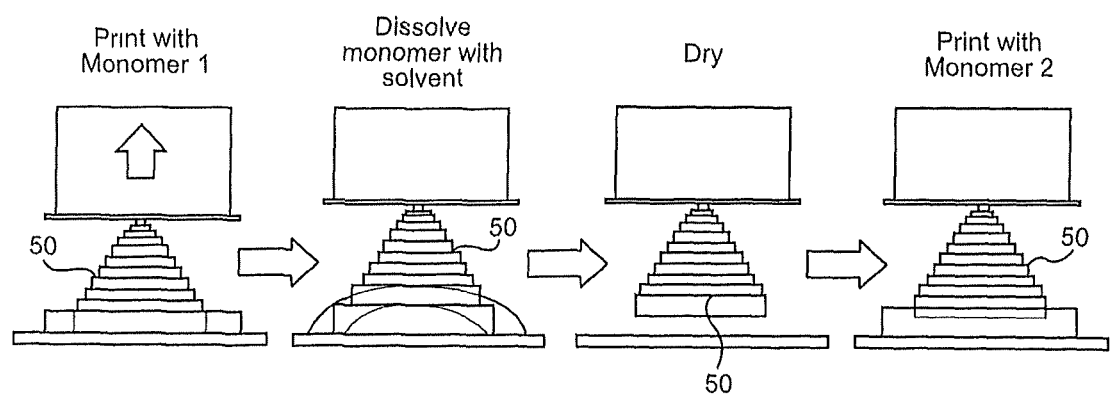
FIG. 4A shows a framework for modulating composition of a structure between layers fabricated in accordance with the present disclosure.

The inverted additive manufacturing framework, which involves polymerizing incremental elements of material in a build-gap allowed for modulating the composition layer-by-layer to achieve gradations in responses to stimuli. FIG. 4A illustrates the approach for creating integral, molecularly-ordered structures 50 with multiple materials. Consider printing with monomer 1 (e.g. R3P1T4) to build a structure 50. Then, a change in the composition is desired to monomer 2 (e.g. RZ7P1R0.1). To accomplish this, after printing with monomer 1, the build-plate is retracted to release the sample from the PDMS substrate. After the temperature is lowered to ambient, a solvent (Toluene+isopropyl alcohol in 4:1 weight ratio) is introduced to dissolve the residual monomers, while not swelling the polymerized structure. Then, the build plate is reset to the desired location and the temperature is raised to dry the build-gap, Now, the second monomer is introduced, and the build process continues.

Figure 4B:
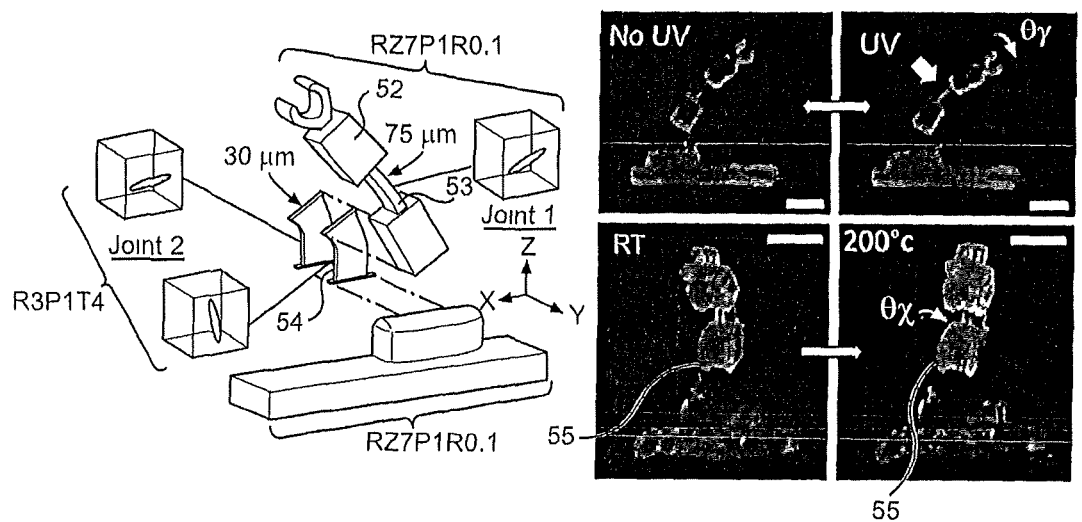
FIG. 4B shows a 2-axis robotic arm, which is directly 3D printed to realize responses to different stimuli in the different joints in accordance with the present disclosure.

Using this multicomposition process, a multi-responsive robotic arm was built. FIG. 4B illustrates an arm 52, which is capable of 2 independent degrees of freedom ($\theta_y$ and $\theta_x$), which are responsive to light and heat respectively. The segments of the arm 52 are fabricated using RZ7P1R0.1 without applying a magnetic field (polydomain nematic orientation). They are intentionally bulky to ensure they remain entirely non-responsive and serve a structural role, Joint 53 (Joint 1), which is designed to be light responsive is also fabricated using RZ7P1R0.1 and is characterized by a homeotropic alignment through its thin axis over the entire thickness of 75 μm. Irradiating this joint with 365 nm light leads to bending away from the actinic source. As seen in the SI Movie 2, irradiating from different sides can be used to drive back and forth actuation at this joint by $\theta_y$~9°. Another joint 54 (Joint 2), was fabricated with the heat responsive R3P1T4 monomer mixture in a bilayered configuration as illustrated in FIG. 4B. The slender axis (60 μm in thickness) of this joint 54 is designed to be normal to that of joint 53 to enable the bending to occur along an orthogonal axis. Heating the entire structure elicits a bending behavior along $\theta_x$ −11°. This behavior is roughly analogous to that observed in twisted nematic LCP created using an analogous composition in Ref.[23]. In addition to actuating the joints 53, 54 using one stimulus at a time, combined application of heat and light leads to the simultaneous triggering of manipulation along both $\theta_y$ and $\theta_x$.

FIG. 4A shows a framework for modulating composition of the structure 50 between layers. FIG. 4B shows a 2-axis robotic arm 52, which is directly 3D printed to realize responses to different stimuli in the different joints. The compositions used in the structure are shown. Joint 53 is responsive to light, by bending away from the actinic light due to its molecular pattern. Joint 54 is a bilayered system, which is responsive to heat. Actuation with light ($\theta_y$) is shown in the top and the thermal actuation ($\theta_x$) is shown in the bottom. Red dashed lines 55 are used to illustrate the original location of the fingers of the arm 52 (scale bars=1 mm). Note the different views used in the panels of FIG. 4B to illustrate the multiaxial manipulation in response to different stimuli. Also, see SI Movie 2.

The present disclosure also includes, in a preferred embodiment, a way to deliver stimulus to individual voxels, where the molecular anisotropy has been imprinted. In the case of light responsive materials, we envision printing optical waveguides 60 (FIGS. 5 and 6) and fibers amongst the voxelated liquid crystal polymer. For thermally stimulated LCP, electrically conductive channels and localized Joule heating elements will be 3D printed amongst the voxels. The idea is to indexably actuate a 3D structure to elicit emergent mechanical and optical responses.

The goal is to enable new classes of micro-optomechanical machines and lab-on-chip devices for microfluidic manipulation, adaptive optics etc.

Figure 5:
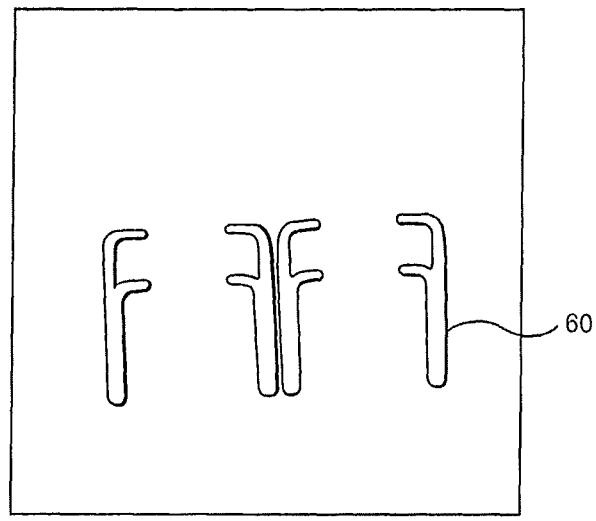
FIGS. 5 and 6 show optical waveguides, each made in accordance with the present disclosure.
Figure 6:
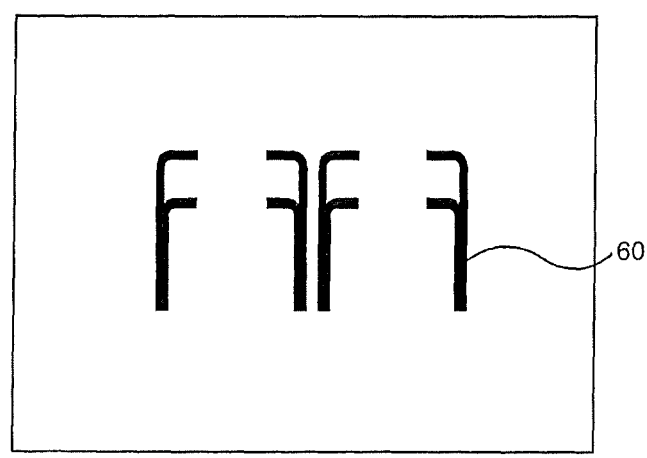

FIGS. 5 and 6 show optical waveguides 60, each made of 5 layers (50 um each) for a total thickness of about 250 um that have been post cured for 30 min at 60° c in vacuum chamber.

Conclusion

A framework for voxel-by-voxel indexing of the molecular order in 3D freeforms is realized with magnetically-assisted additive manufacturing of liquid crystalline polymers. The underlying idea is to utilize a reorientable magnetic field and spatially-resolved irradiation from a digital micromirror device to build 3D objects in an inverted (bottom up) configuration. We identify monomer compositions, optimized for controlling the polymerization depth and stimulus response, to enable fabrication of heat or light responsive structures at scales ranging from the micro to the macro-scale. This platform expands the design space of molecularly-ordered solids to enable microstructural and composition gradients in hitherto difficult to realize geometries. These include, freeform fabrication of light responsive topographies, heat responsive structures that generate Gaussian curvatures from flat geometries and creation of multiresponsive robotic manipulators, which can be controlled using heat and/or light.

Methods

Materials: Thermal responsive resin mixture were created using RM257 (1,4-Bis-[4-(3-acryloyloxypropyloxy)benzoyloxy]-2-methylbenzene) monomer (Wilshire Technologies) mixed with Irgacure 369 (Ciba specialty chemicals) as photoinitiator, Tinuvin 328: 2-(2H-Benzotriazol-2-yl)-4,6-di-tert-pentylphenol (Sigma-Aldrich) as light absorber and Methylhydroquinone (Sigma-Aldrich) as inhibitor. A range of compositions illustrated in Table 1 were examined. Light responsive resin mixtures were created using RM257 monomer mixed with azo 6c (4,4'-di(6-(acryloxy)-hexyloxy) azobenzene), which was synthesized using the procedure described in Ref.[25], Irgacure 784 (Ciba specialty chemicals) as photoinitiator and Methyl red (2-(4-Dimethylaminophenylazo)benzoic acid, 4-Dimethylaminoazobenzene-2'-carboxylic acid, Acid Red 2 purchased from Sigma-Aldrich) as light absorber. After making the composition, the material was melted and vottexed. It was then dispensed on the PDMS during the layer-by-layer fabrication of the structures. The solvent that was used for removing the monomer during the development of the part at the end of printing process, contained Toluene (Fisher Scientific) and Isopropanol (Fisher scientific) with 4:1 wt.

Fabrication System: A commercially available DMD projector (D912HD, Vivitek), which was modified to remove the UV filters was purposed for these experiments. The position of the build plate was controlled using a one-axis motorized translation stage (PT1/M-Z8, Thorlabs). The bottom window was made of a clear acrylic sheet coated with a thin layer of PDMS (Sylgard 184 Dow Corning 184 Silicone Elastomer). In order to control the printing temperature, a heating system including a ring disc heater (200W, McMaster), temperature controller (PXR3, Fuji Electric), thermocouples (5SRTC-TT-J-30-36, Omega) and thermometer (HH802U, Omega) was built. Permanent Neodymium magnets were purchased from K&J Magnetics and mounted on a motorized rotation stage (PRM1Z8, Thorlabs) in order to control the direction of magnetic field.

Printing method. First, A 3D model of the desired structure was designed using Solidworks (Dassault Systems) and saved in .stl format. Then, the 3D model was sliced into black and white 2D patterns of the cross section using slicer software (CreationWorkshops), These patterns were used later to photopolymerize the cross section at each layer. Within each layer of the structure, regions that have different molecular alignment were placed in different layers in the CAD model in order to produce different patterns after the slicing step. A coverslip (build plate) was spin-coated with Elvamide (DuPont) to achieve sufficient adhesion between the cured material and the coverslip. If needed, it can also be used rubbed in suitable directions to impose the alignment on mesogens close to the build plate. Once the coverslip was attached to the platform, it was moved to the desired location (build-gap) close to the PDMS. The cell was then heated to the desired temperature that falls within the nematic phase range of the monomer. The molten monomer mixture was then introduced into the build-gap to build the subsequent layers. A 0.3 T magnetic field was introduced by using two Neodymium permanent magnets (grade N52, K&J Magnetics), In order to achieve the programmed orientation induced by magnetic field, a 5 min dwell time was induced before polymerization. The dwell time provides enough time for the mesogens to rotate and align parallel with the magnetic field. Then, the desired 2D pattern was exposed. The exposure period and intensity were derived from the working curve. For light responsive materials, a 495 nm long pass filter was used. The printing process continued by lifting the platform, rotating the magnetic field (if required) and exposing 2D patterns repeatedly. When all the layers were polymerized and the 3D object was completed, the build plate moved up and the printed structure was removed from the printer. For the final development, the sample was immersed in the solvent (Toluene and IPA 4:1) for 2-5 min. Finally, it was dried in a vacuum chamber for 2-3 min. The final product generally required post-curing process which was executed by exposing ~20 mW cm$^{-2}$ UV light (green light for light responsive materials) for about 30 minutes or heating the sample up to 75° C. for 1 hour.

Measurement of working curves: The curing depth were measured for the variety of photonic energy intensity and material compositions in Table 1. By controlling the grayscale values in the 2D patterns, which were projected, control over the light intensity was achieved. Direct measurements of intensity using a power meter was performed. In order to measure the polymerization depth, the build plate was placed ~2 mm from the PDMS and the whole gap was filled with the monomer. By exposing square patterns with different intensities, the polymerization started from the PDMS surface up to some level below the build plate. Squares with higher intensity (brighter patterns) cured up to higher levels. Measuring the thickness of these squares by a digital micrometer yielded polymerization depth for the respected conditions. This data was used to populate the working curves, which are illustrated in FIG. 2.

Supporting Information

The Supporting Information is available free of charge via the Internet at http:/pubs.acs.org.

Additional figures of the setup, 2D patterns and actuation of basket-like geometries (PDF)

Light actuation of overhanging cantilevers (AVI)

Applying UV light irradiating from different sides in order to drive the robotic arm back and forth (AVI)

Supporting Information

Voxelated Molecular Patterning in 3-Dimensional Freeforms,

Mohsen Tabrizi, Taylor H. Ware and M. Ravi Shankar*

Figure 7:
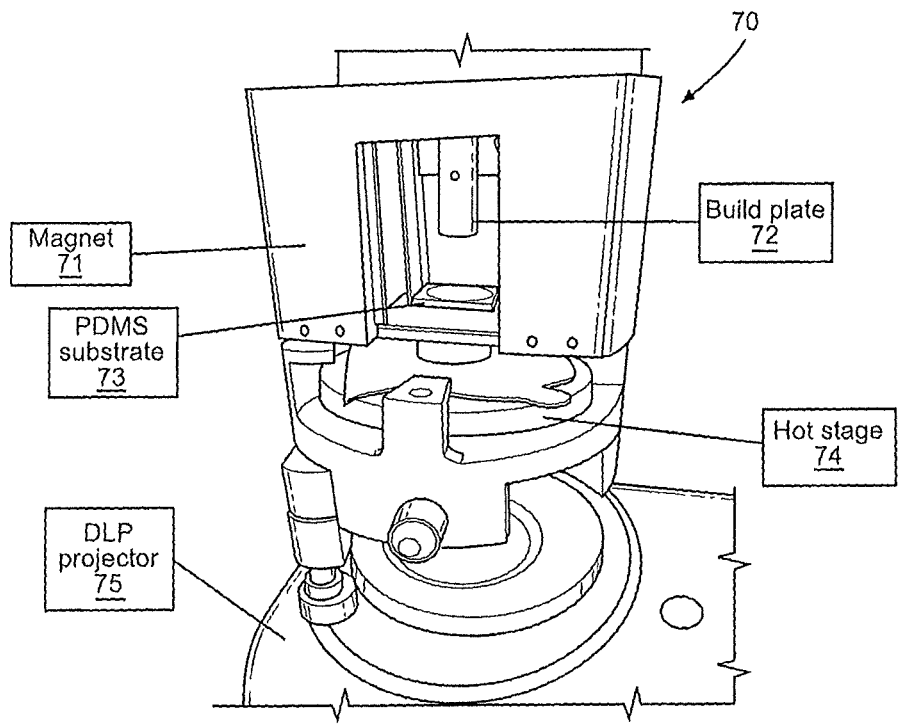
FIG. 7 shows a preferred 3D printer setup of the present disclosure and its components comprising a magnet, build plate, a PDMS substrate, a hot stage and a DLP projector.
Figure 8:
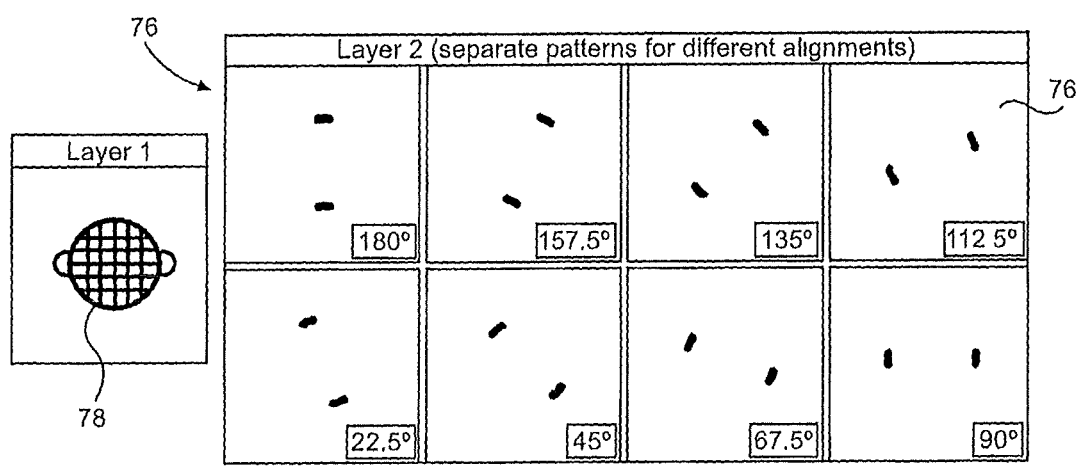
FIG. 8 shows black and white 2D patterns used for fabricating the bilayer basket of FIG. 3A according to the present disclosure.

FIG. 7 shows a preferred 3D printer setup 70 of the present disclosure and its components comprising a magnet 71, build plate 72, PDMS substrate 73, hot stage 74 and DLP projector 75, FIG. 8 shows black and white 2D patterns 76 used for fabricating the bilayer basket of FIG. 3A. The azimuthal molecular orientation was encoded by breaking the ring 78 into 16 different segments and 8 different molecular alignments. Potentially, the accuracy can be increased by segmenting the pattern into smaller sections. The magnetic field direction for each pattern (two segments) are noted in the insets 76.

Figure 9A:
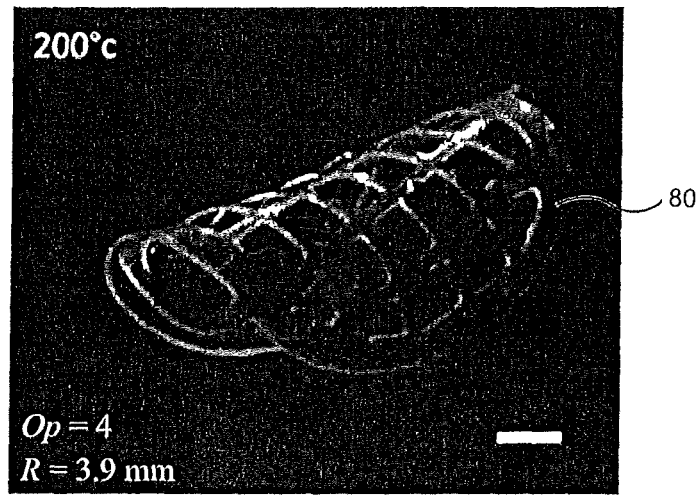
FIGS. 9A and 9B show overcurvature driven transformation of structures of the basket-like geometries due to thermal actuation according to the present disclosure.
Figure 9B:
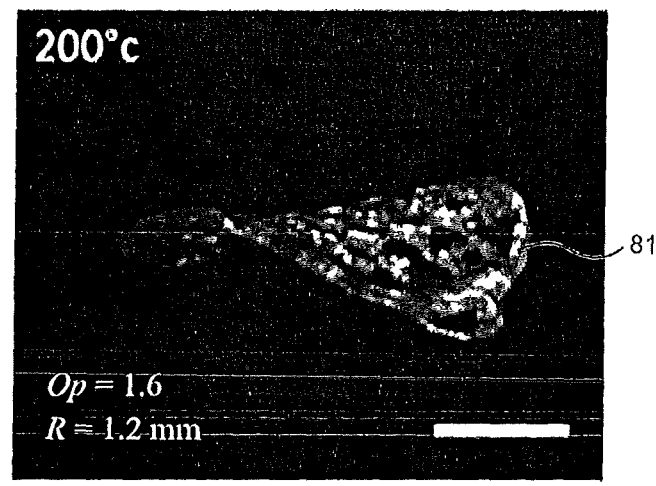

FIGS. 9A and 9B show overcurvature driven transformation of structures of the basket-like geometries 80, 81 due to thermal actuation. A range of overcurvature values can be accessed by varying the radius of the azimuthally-oriented pattern in the prior flat state. (scale bars=1 mm).

Figure 10A:
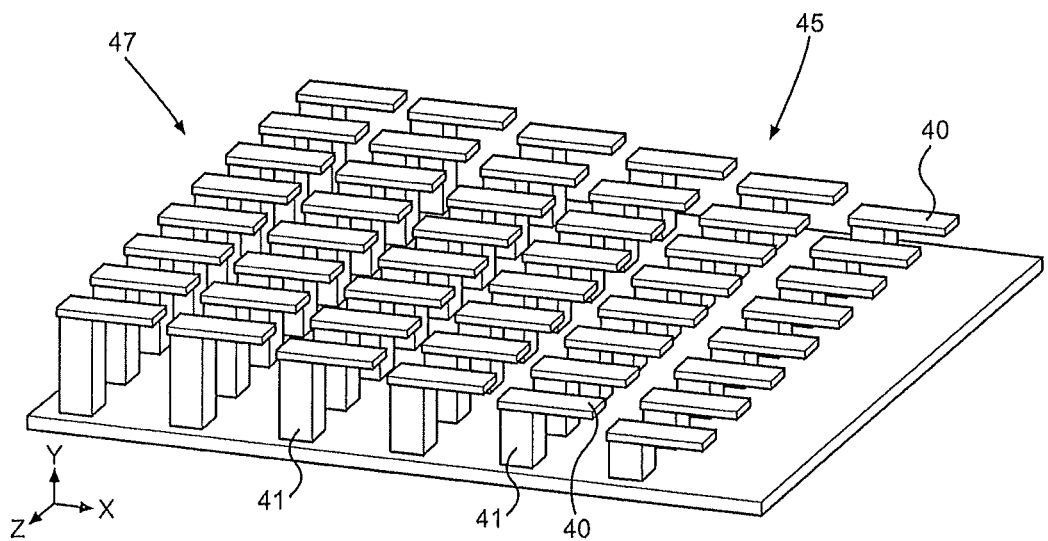
FIG. 10A shows a three-dimensional CAD model of the light responsive array of microstructures of FIG. 3B fabricated in accordance with the present disclosure using a preferred composition of the present disclosure.
Figure 10B:
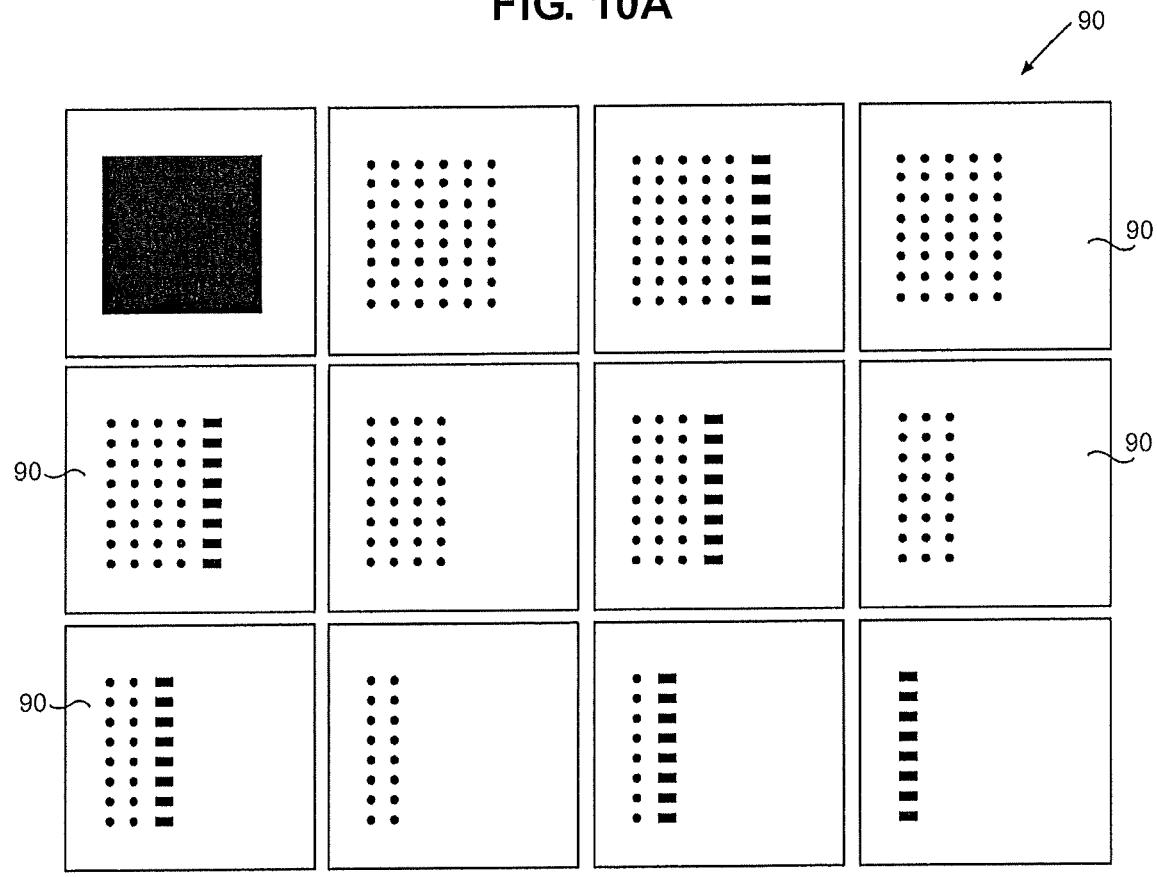
FIG. 10B shows patterns used for making the light responsive array of microstructures of FIG. 3B fabricated in accordance with the present disclosure using a preferred composition of the present disclosure.

FIG. 10A shows a three-dimensional CAD model 47 and FIG. 10B shows patterns 90 used for making the array 45 of overhanging cantilevers 40,

REFERENCES (1) Wehner, M.; Truby, R. L.; Fitzgerald, D. J.; Mosadegh, B.; Whitesides, G. M.; Lewis, J. A.; Wood, R. J., An Integrated Design and Fabrication Strategy for Entirely Soft, Autonomous Robots. Nature 2016, 536 (7617), 451, (2) Chen, T.; Bilal, O. R.; Shea, K.; Daraio, C., Harnessing Bistability for Directional Propulsion of Soft, Untethered Robots. *Proceedings of the National Academy of Sciences* 2018, 115, 5698-5702, (3) Kim, Y.; Yuk, H.; Zhao, R. K.; Chester, S. A.; Zhao, X. H., Printing Ferromagnetic Domains for Untethered Fast-transforming Soft Materials. Nature 2018, 558 (7709), 274.

(4) Gladman, A. S.; Matsumoto, E. A.; Nuzzo, R. G.; Mahadevan, L,; Lewis, J. A., Biomimetic 4D Printing. *Nature materials* 2016, 15, 413.

(5) Ware, T. H.; White, T. J., Programmed Liquid Crystal Elastomers with Tunable Actuation Strain. *Polymer Chemistry* 2015, 6, 4835-4844, (6) Küpfer, J.; Finkelmann, H., Nematic Liquid Single Crystal Elastomers. *Die Makromolekulare Chemie, Rapid Communications* 1991, 12 (12), 717-726.

(7) Kim, H.; Boothby, J. M.; Ramachandran, S.; Lee, C. D.; Ware, T. H., Tough, Shape-changing Materials: Crystallized Liquid Crystal Elastomers. *Macromolecules* 2017, 50 (11), 4267-4275.

($^8$) Harris, K. D.; Bastiaansen, C. W. M.; Broer, D. J., Physical Properties of Anisotropically Swelling Hydrogen-bonded Liquid Crystal Polymer Actuators. *Journal of microelectromechanical systems* 2007, 16 (2), 480-488.

(9) White, T. J.; Broer, D. J., Programmable and Adaptive Mechanics with Liquid Crystal Polymer Networks and Elastomers. *Nature materials* 2015, 14 (11), 1087-1098.

(10) Warner, M.; Terentjev, E. M., *Liquid Crystal Elastomers;* Oxford university press, 2007; Vol. 120.

(11) van Oosten, C. L.; Bastiaansen, C. W. M.; Broer, D. J., Printed Artificial Cilia from Liquid-crystal Network Actuators Modularly Driven by Light. *Nature materials* 2009, 8 (8), 677-682.

(12) Hendrikx, M.; Sirma, B.; Schenning, A. P. H. J.; Liu, D. Q.; Broer, D. J., Compliance-Mediated Topographic Oscillation of Polarized Light Triggered Liquid Crystal Coating. *Advanced Materials Interfaces* 2018, 5 (20), 1800810.

(13) Ware, T. H.; McConney, M. E.; Wie, J. J.; Tondiglia, V. P.; White, T. J., Voxelated Liquid Crystal Elastomers, *Science* 2015, 347 (6225), 982-984.

(14) Schuhladen, S.; Preller, F.; Rix, R.; Petsch, S.; Zentel, R.; Zappe, H., Iris-Like Tunable Aperture Employing Liquid-Crystal Elastomers, *Advanced Materials* 2014, 26 (42), 7247-7251.

(15) Yao, Y. X.; Waters, J. T.; Shneidman, A. V.; Cui, J. X.; Wang, X. G.; Mandsberg, N. K.; Li, S. C.; Balazs, A. C.; Aizenberg, J., Multiresponsive Polymeric Microstructures with Encoded Predetermined and Self-regulated Deformability. "PNAS" *Proceedings of the National Academy of Sciences of the United States of America* 2018, 115(51), 12950-12955.

(16) Ambulo, C. P.; Burroughs, J. J.; Boothby, J. M.; Kim, H.; Shankar, M. R.; Ware, T. H., Four-dimensional Printing of Liquid Crystal Elastomers. *ACS applied materials & interfaces* 2017, 9 (42), 37332-37339.

(17) Kotikian, A.; Truby, R. L.; Boley, J. W.; White, T. J.; Lewis, J. A., 3D Printing of Liquid Crystal Elastomeric Actuators with Spatially Programed Nematic Order. *Advanced Materials* 2018, 30 (10), 1706164.

(18) López-Valdeolivas, M.; Liu, D.; Broer, D. J.; Sanchez-Somolinos, C., 4D Printed Actuators with Soft-Robotic Functions. *Macromolecular rapid communications* 2018, 39 (5), 1700710.

(19) Mostajeran, C.; Warner, M.; Ware, T. H.; White, T. J., Encoding Gaussian Curvature in Glassy and Elastomeric Liquid Crystal Solids. *Proceedings of the royal society A. Mathematical, Physical, and Engineering Sciences* 2016, 472 (2189), 20160112.

(20) Guin, T.; Settle, M. J.; Kowalski, B. A.; Auguste, A. D.; Beblo, R. V.; Reich, G. W.; White, T. J., Layered Liquid Crystal Elastomer Actuators. *Nature communications* 2018, 9 (1), 2531.

(21) Prost, J., *The physics of liquid crystals;* Oxford university press: 1995; Vol. 83.

(22) Iizuka, E., The Effects of Magnetic Fields on the Structure of Cholesteric Liquid Crystals of Polypeptides. *Polymer Journal* 1973, 4 (4), 401.

(23) Lee, K. M.; Bunning, T. J.; White, T. J., Autonomous, Hands-free Shape Memory in Glassy, Liquid Crystalline Polymer Networks. *Advanced Materials* 2012, 24 (21), 2839-2843.

(24) Jacobs, P. F., *Rapid prototyping & manufacturing: fundamentals of stereolithography;* Society of Manufacturing Engineers: 1992.

(25) Skandani, A.; Clement, J. A.; Tristram-Nagle, S.; Shankar, M. R., Aliphatic Flexible Spacer Length Controls Photomechanical Response in Compact, Ordered Liquid Crystalline Polymer Networks, *Polymer* 2017, 133, 30-39.

(26) Yu, Y. L.; Nakano, M.; Shishido, A.; Shiono, T.; Ikeda, T., Effect of Cross-linking Density on Photoinduced Bending Behavior of Oriented Liquid-crystalline Network Films Containing Azobenzene. *Chemistry of materials* 2004, 16 (9), 1637-1643.

(27) Mouthuy, P.-O.; Coulombier, M.; Pardoen, T.; Raskin, J.-P.; Jonas, A. M., Overcurvature Describes the Buckling and Folding of Rings from Curved Origami to Foldable Tents. *Nature communications* 2012, 3, 1290.

(28) Yu, Y. L.; Nakano, M.; Ikeda, T., Photomechanics: Directed Bending of a Polymer Film by Light. *Nature* 2003, 425 (6954), 145.

(29) Choi, J.; Jo, W.; Lee, S. Y.; Jung, Y. S.; Kim, S.-H.; Kim, H.-T., Flexible and Robust Superomniphobic Surfaces Created by Localized Photofluidization of Azopolymer Pillars. *ACS nano* 2017, 11 (8), 7821-7828.

What is claimed is:

1. An artificial muscle or soft robot comprising an anisotropic macroscopic structure or anisotropic macroscopic material, comprising:
    a plurality of layers of a photocured liquid crystalline (LC) monomer comprising a plurality of molecular directors or nematic alignment vectors, wherein each of the plurality of molecular directors or nematic alignment vectors is disposed within one of a plurality of locations within the photocured LC monomer, wherein each of the plurality of locations is unique with respect to all others of the plurality of locations within the photocured LC monomer; and wherein each of the plurality of molecular directors or nematic alignment vectors within each of the plurality of layers of photocured LC monomer is antiparallel to or different from multiple or all of the others of the plurality of molecular directors or nematic alignment vectors in that layer of photocured LC monomer.

2. The artificial muscle or soft robot of claim 1 wherein a polymerization depth of the LC monomer at each of the plurality of locations within each of the plurality of layers of photocured LC monomer is equal with the polymerization depth of the LC monomer at multiple or all of the others of the plurality of locations in that layer of photocured LC monomer.

3. The artificial muscle or soft robot of claim 1 further comprising a stimuli delivery system comprising a conduit for delivery of heat, light and/or solvent stimuli to each of the plurality of locations.

4. The artificial muscle or soft robot of claim 3 wherein the stimuli delivery system was produced by additive manufacturing at the same time as the anisotropic macroscopic structure or anisotropic macroscopic material.

5. The artificial muscle or soft robot of claim 1 wherein the LC monomer has a composition comprising one or more of a diacrylate for providing temperature sensitive actuation, an azobenzene-functionalized crosslinker for providing light responsive actuation, a photoinitiator, a UV light absorber, a visible light absorber and a polymerization inhibitor.

6. The artificial muscle or soft robot of claim 1 wherein the anisotropic macroscopic structure or anisotropic macroscopic material is capable of transducing one, a plurality or all of thermal, chemical, magnetic, and light energy into mechanical work.

7. The artificial muscle or soft robot of claim 1 wherein the muscle or soft robot is capable of compound movement; wherein the compound movement comprises one or more movements selected from the group consisting of the ability to change shape and length, either simultaneously or non-simultaneously, the ability to extend and twist simultaneously; and the ability to contract and twist simultaneously.

8. The artificial muscle or soft robot of claim 1 wherein the plurality of molecular directors or nematic alignment vectors within a first layer of the plurality of layers of photocured LC monomer exhibit orthotropic anisotropy with respect to the plurality of molecular directors or nematic alignment vectors within second and third layers of the plurality of layers of photocured LC monomer.

9. The artificial muscle or soft robot of claim 1 wherein the plurality of molecular directors or nematic alignment vectors within a first layer of the plurality of layers of photocured LC monomer exhibit chiral anisotropy with respect to the plurality of molecular directors or nematic alignment vectors within a second layer of the plurality of layers of photocured LC monomer.

10. An artificial muscle or soft robot comprising an anisotropic macroscopic structure or anisotropic macroscopic material, comprising:
one or more layers of a first photocured liquid crystalline (LC) monomer;
one or more layers of a second photocured liquid crystalline (LC) monomer;
a plurality of molecular directors or nematic alignment vectors, wherein each of the plurality of molecular directors or nematic alignment vectors is disposed at one of a plurality of locations within the first and second photocured LC monomers, wherein each of the plurality of locations is unique with respect to all others of the plurality of locations within the first and second photocured LC monomers and wherein each of the plurality of molecular directors or nematic alignment vectors within each layer of the first or second photocured LC monomer is antiparallel to or different from multiple or all of the others of the plurality of molecular directors or nematic alignment vectors in that layer of the first or second photocured LC monomer.

11. The artificial muscle or soft robot of claim 10 wherein a polymerization depth of the LC monomer at each of the plurality of locations within each layer of the first or second photocured LC monomer is equal with the polymerization depth of the respective LC monomer at multiple or all of the others of the plurality of locations in that layer of the first or second photocured LC monomer.

12. The artificial muscle or soft robot of claim 10 further comprising a stimuli delivery system comprising a conduit for delivery of heat, light and/or solvent stimuli to each of the plurality of locations.

13. The artificial muscle or soft robot of claim 12 wherein the stimuli delivery system was produced by additive manufacturing at the same time as the anisotropic macroscopic structure or anisotropic macroscopic material.

14. The artificial muscle or soft robot of claim 10 wherein each of the first LC monomer and the second LC monomer has a composition comprising one or more of a diacrylate for providing temperature sensitive actuation, an azobenzene-functionalized crosslinker for providing light responsive actuation, a photoinitiator, a UV light absorber, and a visible light absorber and a polymerization inhibitor.

15. The artificial muscle or soft robot of claim 10 wherein the x, y and z dimensions of each of the plurality of locations are approximately ≤50 μm×50 μm×50 μm.

16. The artificial muscle or soft robot of claim 10 wherein the first LC monomer and the second LC monomer have respective compositions that are different.

17. The artificial muscle or soft robot of claim 10 wherein the anisotropic macroscopic structure or anisotropic macroscopic material is capable of transducing one, a plurality or all of thermal, chemical, magnetic, and light energy into mechanical work.

* * * * *